(12) United States Patent
Duggal et al.

(10) Patent No.: US 12,197,758 B2
(45) Date of Patent: Jan. 14, 2025

(54) DISTRIBUTED OBJECT REPLICATION ARCHITECTURE

(71) Applicant: EMC IP Holding Company LLC, Hopkinton, MA (US)

(72) Inventors: Abhinav Duggal, Milpitas, CA (US); Atul Avinash Karmarkar, San Jose, CA (US); Philip Shilane, Newtown, PA (US); Kevin Xu, Warren, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 865 days.

(21) Appl. No.: 16/931,299

(22) Filed: Jul. 16, 2020

(65) Prior Publication Data

US 2020/0348852 A1 Nov. 5, 2020

Related U.S. Application Data

(63) Continuation of application No. 15/887,563, filed on Feb. 2, 2018, now Pat. No. 10,761,765.

(51) Int. Cl.
*G06F 3/06* (2006.01)
*G06F 9/48* (2006.01)

(52) U.S. Cl.
CPC ............ *G06F 3/065* (2013.01); *G06F 3/0604* (2013.01); *G06F 3/0619* (2013.01); *G06F 3/067* (2013.01); *G06F 9/4881* (2013.01); G06F 2201/84 (2013.01)

(58) Field of Classification Search
CPC ...... G06F 3/065; G06F 3/0604; G06F 3/0619; G06F 3/067; G06F 9/4881; G06F 2201/84; G06F 11/1471; G06F 3/0607; G06F 3/0613; G06F 3/0641; G06F 9/52; G06F 11/2094
See application file for complete search history.

(56) References Cited

U.S. PATENT DOCUMENTS

| | | | |
|---|---|---|---|
| 1,009,125 A | | 11/1911 | Zempliner |
| 6,049,809 A | * | 4/2000 | Raman ................ H04L 67/1095 |
| | | | 707/999.203 |
| 6,519,571 B1 | | 2/2003 | Guheen |
| 7,277,913 B2 | | 10/2007 | Kashyap |
| 7,653,668 B1 | | 1/2010 | Shelat |
| 8,572,290 B1 | | 10/2013 | Mukhopadhyay |

(Continued)

OTHER PUBLICATIONS

Vamsi Chitters, et al., Aergia: Haskell Distributed In-Memory Key-Value Store, Mar. 18, 2016, pp. 1-7.

*Primary Examiner* — Pierre M Vital
*Assistant Examiner* — Zuheir A Mheir
(74) *Attorney, Agent, or Firm* — Staniford Tomita LLP

(57) ABSTRACT

A source site includes a controller, a set of source worker nodes, and a message queue connected between the controller and source worker nodes. The message queue receives messages and stores the messages for retrieval. A destination site includes a set of destination worker nodes. Tasks are generated to replicate changes to objects at the source site to the destination site. The controller pushes messages corresponding to the tasks onto the message queue. A source worker node retrieves a message corresponding to a task from the message queue for processing in conjunction with a destination worker node. The message is indicated as having been retrieved from the message queue.

19 Claims, 21 Drawing Sheets

(56) References Cited

U.S. PATENT DOCUMENTS

| | | |
|---|---|---|
| 8,868,514 B2 | 10/2014 | Lomet |
| 9,171,002 B1* | 10/2015 | Mam ..................... G06F 3/0619 |
| 9,990,253 B1 | 6/2018 | Rajimwale |
| 10,565,230 B2* | 2/2020 | Zheng ............... G06F 16/24575 |
| 11,089,105 B1* | 8/2021 | Karumbunathan ..... G06F 3/065 |
| 2005/0138306 A1* | 6/2005 | Panchbudhe ....... G06F 11/2097 |
| | | 714/E11.121 |
| 2007/0043841 A1 | 2/2007 | Cannon |
| 2007/0177739 A1 | 8/2007 | Ganguly |
| 2009/0049054 A1 | 2/2009 | Wong |
| 2009/0132541 A1 | 5/2009 | Barsness |
| 2010/0037056 A1 | 2/2010 | Follis |
| 2010/0106808 A1 | 4/2010 | Ogus |
| 2011/0023046 A1 | 1/2011 | Gold |
| 2011/0099420 A1 | 4/2011 | MacDonald McAlister |
| 2011/0196882 A1 | 8/2011 | Kesselman |
| 2012/0054296 A1 | 3/2012 | Chaudhry |
| 2012/0089775 A1 | 4/2012 | Ranade |
| 2013/0152196 A1 | 7/2013 | Garg |
| 2013/0173539 A1 | 7/2013 | Gilder |
| 2014/0040182 A1 | 2/2014 | Gilder |
| 2014/0081916 A1 | 3/2014 | McAlister |
| 2014/0201363 A1 | 7/2014 | McAlister |
| 2014/0279884 A1 | 9/2014 | Dantkale |
| 2014/0344222 A1 | 11/2014 | Morris |
| 2015/0161048 A1 | 6/2015 | Patil |
| 2016/0026535 A1 | 1/2016 | Bhat |
| 2016/0048408 A1* | 2/2016 | Madhu .................. H04L 47/783 |
| | | 718/1 |
| 2016/0188232 A1 | 6/2016 | Ramachandran |
| 2017/0013057 A1 | 1/2017 | Shani |
| 2017/0031776 A1* | 2/2017 | Ren ....................... G06F 11/1451 |
| 2017/0032013 A1* | 2/2017 | Zheng ............... G06F 16/24575 |
| 2017/0075620 A1 | 3/2017 | Yamamoto |
| 2017/0154050 A1 | 6/2017 | Reimer |
| 2017/0185323 A1 | 6/2017 | Kaushik |
| 2017/0199893 A1 | 7/2017 | Aronovich |
| 2018/0004761 A1 | 1/2018 | Doherty |
| 2018/0011914 A1 | 1/2018 | Doherty |
| 2018/0270125 A1* | 9/2018 | Jain ......................... G06F 16/00 |
| 2018/0349178 A1* | 12/2018 | Painter .................. G06F 9/5083 |
| 2019/0026042 A1 | 1/2019 | Gupta |
| 2019/0073281 A1 | 3/2019 | Wicaksono |

\* cited by examiner

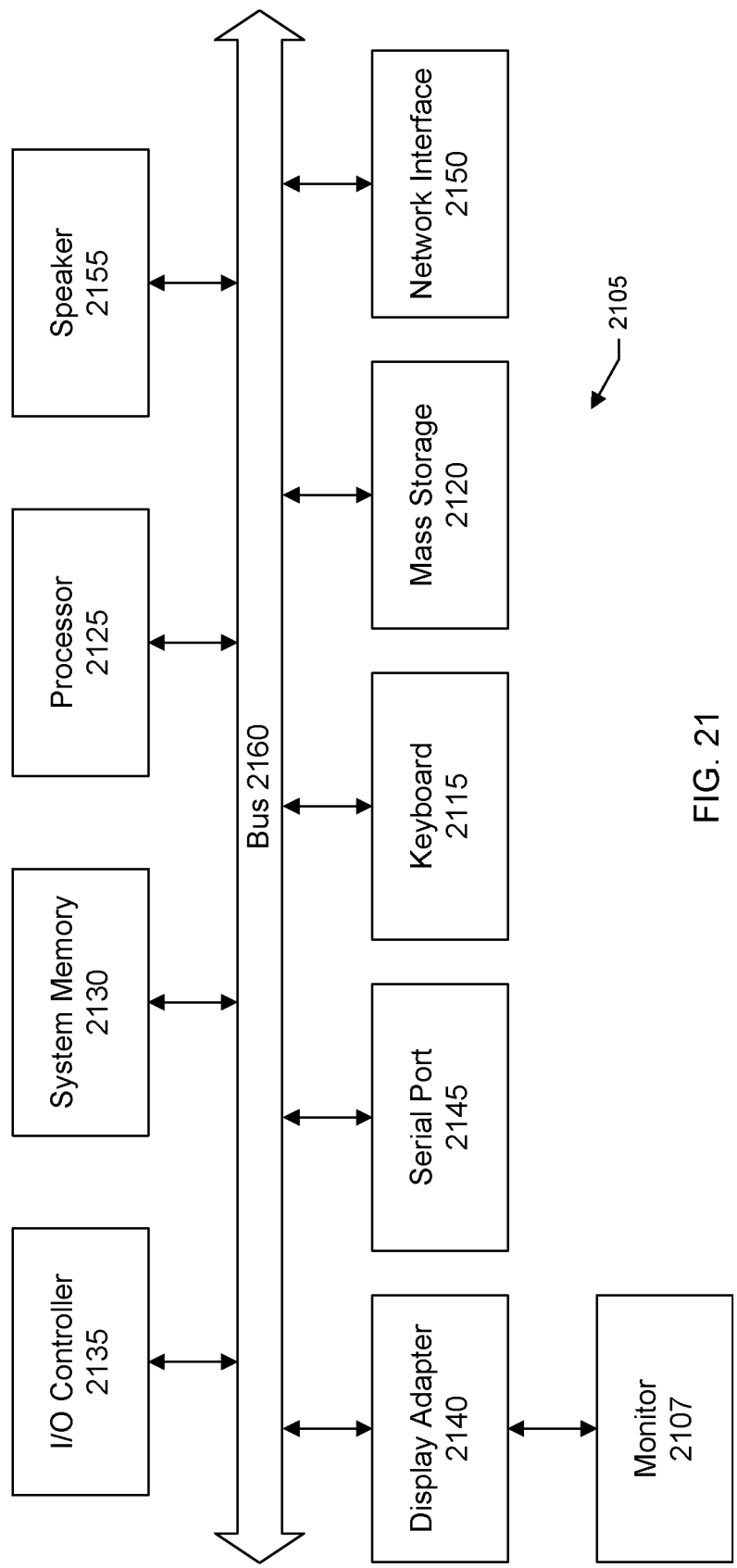

DISTRIBUTED OBJECT REPLICATION ARCHITECTURE

CROSS-REFERENCE TO RELATED APPLICATIONS

This application is a continuation of U.S. patent application Ser. No. 15/887,563, filed Feb. 2, 2018, and is related to U.S. patent application Ser. No. 15/887,599, filed Feb. 2, 2018, now U.S. Pat. No. 10,509,675, issued Dec. 17, 2019; Ser. No. 15/887,647, filed Feb. 2, 2018, now U.S. Pat. No. 10,585,746, issued Mar. 10, 2020; and Ser. No. 15/887,680, filed Feb. 2, 2018, which are all incorporated herein by reference for all purposes.

TECHNICAL FIELD

The present invention relates generally to the field of information management, and, more particularly, to replicating data.

BACKGROUND

Replication is a process for creating copies of data. Organizations may replicate data for any number of reasons. For example, having another copy of data can help an organization quickly recover from failures at the primary site. In other cases, an organization may wish to move their data from one cloud site to another (e.g., move from a private cloud to a public cloud or vice-versa).

Current systems, however, are unable to adjust to changing requirements. The amount of data to replicate can vary tremendously based on many different micro- and macro-economic factors. Factors may include the frequency of replication, type of data to replicate, seasonal demands, business expansion, business contraction, and even the current legal, political, and social climate.

An organization may over-estimate its requirements, which results in an over-provisioning of resources. Replications may thus be completed very quickly, but such an over-provisioning is wasteful because it can result in other initiatives not receiving adequate funding. Alternatively, an organization may under-estimate its requirements, which results in an under-provisioning of resources. As a result, replications may require an unacceptably long time to complete or unexpectedly terminate because of the lack of resources.

There is a need for improved systems and techniques to adapt to rapidly changing conditions under which replication may occur and to provide efficiencies in data replication.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 21 shows a block diagram of a computer system suitable for use with the system in accordance with one or more embodiments.

DETAILED DESCRIPTION

Figure 1A:
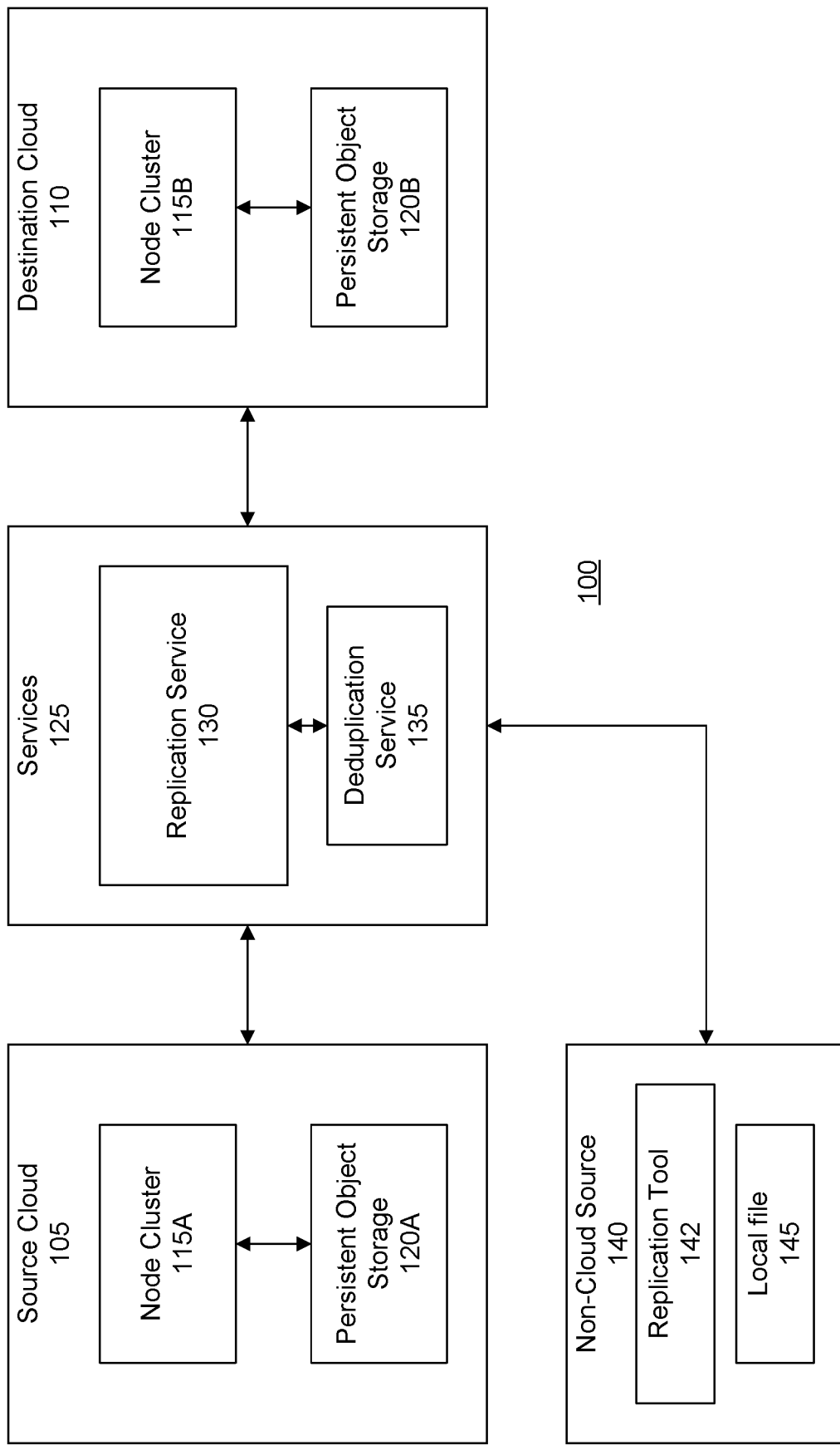
FIG. 1A shows a block diagram of a system having replication services in accordance with one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems for distributed object replication. In a specific embodiment, a replication technique is designed to distribute the replication work across multiple worker nodes on both the source and destination sites. Based on factors including available bandwidth, input/output operations per second (IOPS), computing costs, replication priority, other factors, or combinations of these, the number of worker nodes on each site can be adjusted. In other words, new nodes can be allocated or activated dynamically. Alternatively, existing nodes can be deallocated or deactivated dynamically.

FIG. 1A shows a simplified block diagram of a computing environment 100 in which a replication service may be provided. In FIG. 1A, there is a source site that may include a source cloud 105 and a destination site that may include a destination cloud 110. The source cloud includes one or more node clusters 115A and persistent object storage 120A connected to node cluster 115A. Likewise, the destination cloud includes one or more node clusters 115B and persistent object storage 120B connected to node cluster 115B.

The source and destination sites (or, more particularly, source and destination node clusters 115A, B) access, run, or execute a set of services 125. The set of services include a replication service 130. The replication service is responsible for replicating objects and changes from source object storage 120A to destination object storage 120B. A replication operation may include copying an object or portion of an object from source object storage to destination object storage. A replication operation may include deleting an object or a portion of an object from destination object storage. One or more services may be a physical device that includes non-transitory storage, memory (e.g., Random Access Memory), and one or more processors. The physical device may be, for example, a server. The physical device may be other types of computing devices. The non-transitory storage may include instructions which, when executed by the one or more processors, enable the physical device to perform the functions described herein.

In a specific embodiment, the replication service operates in conjunction with a deduplication service 135. The deduplication service helps to ensure that objects (or portions of objects) already existing at the destination site are not again copied over and saved to destination object storage. Non-duplicate objects (or nonduplicate portions of objects) may be compressed prior to be being copied over and saved to destination object storage. A specific example of services include the Data Domain (DD) Microservices as provided by Dell EMC of Hopkinton, Massachusetts DD Microservices is a deduplication and compressed object storage service designed to run in the cloud.

Replication from a source data storage site to a destination site is desirable for both data protection and availability. Replication may run based on a user command (e.g., on demand), continuously, or on a schedule with the overall goal of making a secondary site (e.g., destination) match the contents of the primary site (e.g., source). In a specific embodiment, a replication architecture is provided in a cloud computing environment where resources for services can be allocated and freed dynamically.

The replication architecture efficiently replicates objects from a source site to a destination site. The source and destination may be within a private data center or in a public cloud. The source and destination may be in different data centers or public clouds. Examples of a public cloud include Microsoft's Azure and Amazon's Web Services. Features of such environments in accordance with one or more embodiments include object storage that can be accessed by multiple computational nodes that have authentication permissions as well as the ability to dynamically allocate/deallocate computational nodes. To achieve the goals of efficiently replicating objects from source to destination, multiple computational nodes are provided at both sites. The nodes may be referred to as worker nodes. The replication service helps to control costs associated with worker nodes.

Replication may include replicating across a cluster or across a cloud boundary. Replication may include replicating from a first region of a cloud to a different second region within the same cloud. Replication may include replicating from a first cloud to a second cloud, different, separate, or remote from the first cloud. The replication source and destination designations may be swapped or reversed such as when restoring from a cloud repository. Replication may include replicating from a source site to multiple (e.g., two or more) destination sites.

Replication may include replicating from a non-cloud source to the cloud destination site. For example, there can be a non-cloud source 140 (e.g., laptop, smartphone, tablet computer, desktop computer, or other local computing device). The non-cloud source may not have the resources or capability to run the replication service like a node cluster. Nonetheless, in a specific embodiment, the non-cloud source is provided with a replication tool 142 that allows a local file 145 stored at the non-cloud source to be likewise replicated efficiently to the destination cloud. The non-cloud source may lack the compute resources and dynamic scalability of the node cluster. Furthermore, customers of the replication system may be reluctant to dedicate the time and effort to install and configure the replication microservice locally. Thus, in a specific embodiment, the tool is designed to be lightweight with a limited set of capabilities as compared to the cluster-implemented microservice.

A node may be a container or virtual machine running on a host hardware platform. A host may host any number of containers, virtual machines, or both. In an embodiment, a host refers a physical or virtual machine that can run one or more nodes or containers as part of the microservices including the replication microservices. The term client may refer to a customer or a customer's computer resources outside of the microservices that communicate with the microservices. The host may be a general purpose computer including physical hardware and software. The physical hardware may include a processor, memory, storage (e.g., hard disk, flash storage), network interface, input/output (I/O) controller, and the like, each of which may be interconnected by a bus architecture of the host system. The host includes virtualization software such as a hypervisor or container manager. Hypervisors and container managers provide an abstraction of the underlying hardware to the virtual compute environments and help to ensure isolation of the hosted virtual environments.

Generally, virtualization is an abstraction layer that allows multiple virtual environments to run in isolation, side-by-side on the same physical machine. A virtual machine (VM) is a software implementation of a machine (e.g., a computer) that executes programs like a physical machine. In other words, the virtual machine is a software abstraction of a physical computer system that is installed as a "guest" on a "host" hardware platform. A computer running the hypervisor is a host machine and all virtual machines are guest machines running guest operating systems (OS). In other words, the host may include a hardware platform, host operating system, and hypervisor supporting multiple virtual machines that have their own guest operating systems and guest applications.

Likewise, containers also provide for isolated environments and applications. In a container system, however, the underlying operating system provides the basic services to all of the containerized applications using virtual-memory support for isolation; whereas with hypervisors and VMs, the VMs have their own operating system using hardware VM support. That is, applications running in a container environment share an underlying operating system, while VMs can run different operating systems. One example of a container platform is Docker as provided by Docker, Inc. of San Francisco, California Containers typically have a lower overhead than VMs. VMs, however, can provide a higher level of isolation. In a specific embodiment, multiple containers are run within a VM. In another specific embodiment, there can be separate VMs.

In a specific embodiment, the set of services are provided using a microservice or micro-service architecture. A microservice architecture is a design pattern in which complex software systems are composed of relatively small and highly decoupled processes called "microservices." By design, a micro-service provides limited functionality narrowly focused on a single task. Each micro-service may be independently deployable and upgradeable. Micro-services may communicate with each other using language-agnostic application programming interfaces (APIs). Some micro-service architectures use inter-process communication mechanisms that are relatively slow, such as Representational State Transfer (REST) APIs or other language-agnostic APIs. In a specific embodiment, remote procedure calls (RPCs) are used where a replication microservice worker node or local tool on a non-cloud source can call a function on a replication microservice worker node at a remote destination. There are software packages that enable RPCs that involve running a RPC server at the destination site. In this specific embodiment, the source site connects to the remote RPC server and then makes RPCs to perform replication.

Figure 1B:
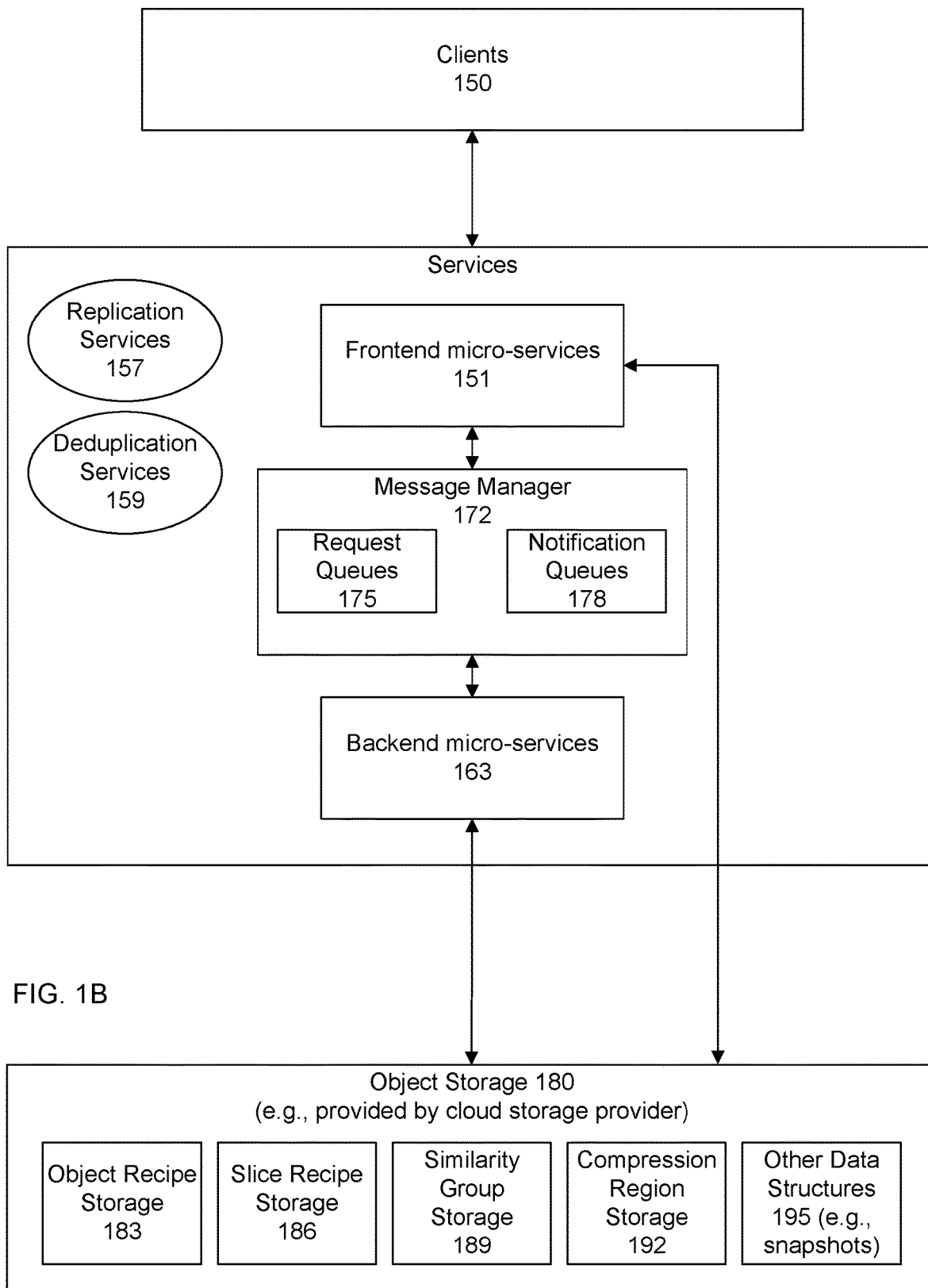
FIG. 1B shows a block diagram of a micro-services architecture including replication services in accordance with one or more embodiments.

FIG. 1B shows a system employing a micro-service architecture in accordance with one or more embodiments of a distributed object replication system. The system may include clients 150 that store data in an object storage 180, a replication service 157 that replicates data from another storage location and a deduplication service 159 that deduplicates the data from the clients before the data is stored in object storage 180. In one or more embodiments, the clients and/or the object storage are not part of the system.

The clients may be computing devices. The computing devices may be, for example, mobile phones, tablet computers, laptop computers, desktop computers, or servers. Further examples of clients include clients that are running in the cloud, such as on a virtual machine or in a container running in a public and/or private cloud environment. The clients may be other types of computing devices without departing from the invention.

The clients may be operably connected to the replication service, deduplication service, or both. While not shown in FIG. 1B, the clients may be operably connected to the persistent storage or other elements of the system without departing from the invention.

The object storage may include a persistent object storage system. The persistent object storage system may include hard disk drives, solid state drives, any other type of persistent storage media, or a logical storage including any combination of the aforementioned storage media and/or other types of persistent storage. In one or more embodiments, the persistent storage may be a cloud storage service. A cloud storage service may be a logical storage that includes any number of physical storage devices operable connected and/or unified to form a logical storage. The logical storage may include redundancy or other data integrity features that ensure that failure of any of the physical storage elements does not cause data stored in the logical storage to be lost. In a specific embodiment, the object storage is provided by a third-party cloud services provider. Some examples of cloud-based object storage include Amazon S3 as provided by Amazon, IBM Cloud Object Storage by IBM, Google Cloud Storage by Google, Azure Blob Storage by Microsoft, and others. Cloud-based object storage may be referred to as blog storage.

As used herein, an object storage is a data storage architecture that manages data as objects. Each object of the object storage may include data, meta-data, and/or a globally unique identifier of the object. The object may include a number of bytes for storing data in the object. Each object of the object storage may include a different number of bytes without departing from the invention. In one or more embodiments, the object storage does not include a file system.

In a specific embodiment, the object storage includes several data structures or storage regions including object recipe storage 183, slice recipe storage 186, similarity group storage 189, compression region storage 192, and other data structures or storage 195 (e.g., snapshots) that may be stored persistently. These structures are generated by the microservice and stored or written to the object storage. In a specific embodiment, when a client writes an object to the microservice, the microservice performs a deduplication and generates a number of pieces of data and metadata that are stored in object storage. Such pieces include the object recipes, slice recipes, similarity groups, and compression regions. These pieces of data and metadata facilitate the overall management and organization of the customer objects including processes for replication, deduplication, retrieval, and parallelism. For example, an object can be split so that different portions of the object may be deduplicated in parallel with each other. This can be especially beneficial in cases where the object is very large.

In particular, when a customer's object is written to the microservice via the client, the object is split or divided into one or more sets of segments. A fingerprint is computed for each segment. Thus, a fingerprint maps to a segment. Lists of fingerprints are organized into slice recipes. Specifically, a slice recipe may include an array of fingerprints and sizes of segments that are associated with the fingerprints in the array. A sketch may then be computed for each slice recipe. Slice recipes may then be organized into similarity groups. Specifically, a similarity group may include one or more slice recipes, each of the one or more slice recipes having the same sketch. In other words, slice recipes may be determined to be similar to each other if they have the same sketch. An object recipe, in turn, forms a one-to-one mapping to a customer's object and references one or more slice recipes associated with the object (i.e., slice recipe references an array of segments by fingerprint). The actual segments that have been determined to be unique according to the deduplication service may be stored in in a compressed format in the compression regions.

In a specific embodiment, a segment is about 8 KB in size and slice recipes span about 8 MB in size of content from an object. Thus, a slice recipe may include about 1,000 segments. Consider, as an example, a 16 MB object being stored by a client. In this example, there can be two slice recipes, each slice recipe spanning about 8 MB.

A sketching algorithm may then be applied to calculate a sketch for each slice recipe. A sketch may be a value that is representative of or based on the fingerprints in the slice recipe. There can be many different sketching algorithms. Consider, as an example, a slice recipe having an array of 1,000 fingerprints (corresponding to 1,000 segments), each fingerprint being 20 bytes in size.

In a specific embodiment, a sketching algorithm may include selecting a fingerprint from the array having the highest value, and designating the selected fingerprint as being the sketch of the slice recipe. In another specific embodiment, a sketching algorithm may include selecting a portion of each fingerprint from the array to form a set of truncated fingerprints (e.g., select first 8 bytes of a fingerprint and ignore the remaining bytes), selecting a truncated fingerprint having the highest value, and designating the selected truncated fingerprint as being the sketch of the slice recipe. In another specific embodiment, a sketching algorithm may include selecting the fingerprint having the lowest value. A sketching algorithm may include performing or applying any number of mathematical operations, logical operations, or functions to the fingerprints to obtain a single value that is to be designated as the sketch of the slice recipe. The similarity groups—into which slice recipes having the same sketch are grouped or organized—can function as a set of indexes to improve deduplication performance.

The object recipes facilitate, among other things, the management of data as represented by objects. In a specific embodiment, each object has a corresponding object recipe. The object recipe may be identified based on the name given to an object by the customer or user. In a specific embodiment, a name of the object recipe is generated by obtaining a name of an object (as provided by the user) and concatenating, augmenting, or tagging the object name with additional metadata or tags to form the name of the object recipe.

For example, in a specific embodiment, a prefix (e.g., "obj") may be prepended to the object name to identify the associated unit of data as being an object. A timestamp may be appended as a suffix to identify the date and time that the object was written to object storage. Other reserved symbols may instead or additionally be added to form the name of the object recipe.

For example, an object named "Object A" by the user may have a corresponding object recipe named "obj ## Object A ## Time 5." In this example, the hash marks are reserved symbols that help to separate the parts of the string. In other words, the user-generated name is "Object A" and hash marks (e.g., "##") are used as a reserved symbol that is concatenated onto the user-generated name, followed by a timestamp. In this example, the microservice system does not allow user-generated names to include hash marks "##."

It should be appreciated that the hash mark is merely an example of a reserved symbol. Different symbols or combinations of other symbols may instead or additionally be used such as question marks (e.g., "??"), exclamation points (e.g., "! !"), and so forth. An object recipe name may instead or additionally include other metadata, identifiers, tags, and the like. For example, the object recipe name may include an identifier (e.g., unique domain identifier) of the user or customer to which the object belongs, bucket identifier, and so forth.

When for example, a client customer issues through the frontend services a request to list their objects stored in the object storage, a corresponding command or query may be generated and issued to the underlying object storage system. The query may be formatted with or include, for example, criteria such as a first tag (e.g., "obj") indicating that objects are to be returned, a second tag identifying the name of the object to return (e.g., "object A"), or any other criteria, keywords, or search directives. In turn, the underlying object storage system may respond with a listing of object recipe names matching the query. However, prior to returning the results to the client customer, the object recipe names may be processed to remove any system generated or internally generated tags or metadata such as prefixes (e.g., "obj"), string separators (e.g., "##"), timestamps (e.g., "Time 5"), and the like.

The message manager 172 may facilitate transmission of requests and notifications between the frontend micro-services 151 and the backend micro-services 163. In one or more embodiments, the message manager may be a service executing on a cloud platform. The message manager may include request queues 175 and notification queues 178. A request queue may be referred to as a task queue. A notification queue may be referred to as a task status update messages queue. Further details are provided below.

Figure 2:
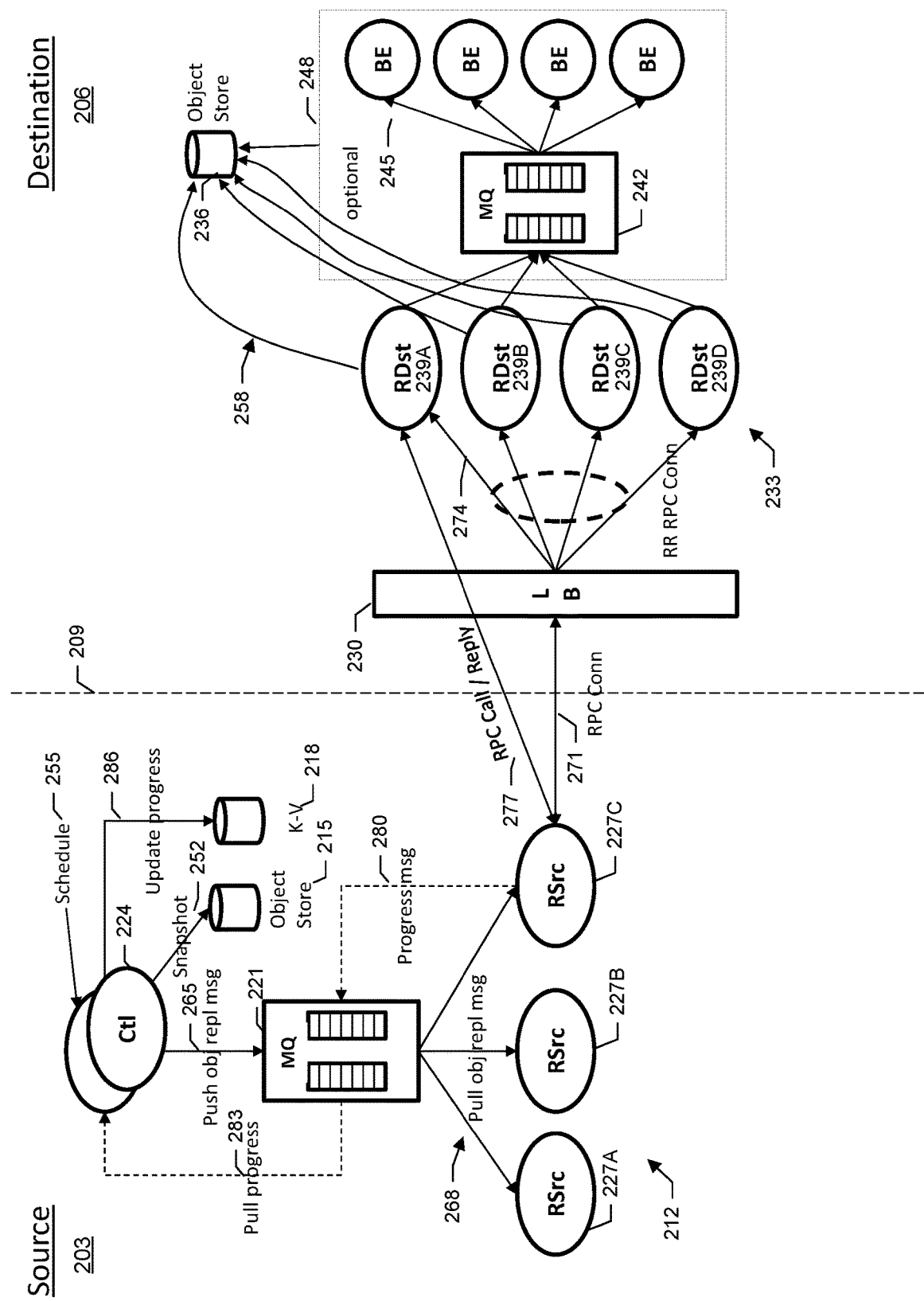
FIG. 2 shows a top level architecture of a distributed object replication system in accordance with one or more embodiments.

FIG. 2 shows a detailed top level architecture of a system for distributed object replication. There is a source side 203 and a destination side 206. The source and destination sides are separated by a boundary 209. The boundary may be cluster boundary (e.g., source and destination are in different clusters of the same site) or cloud boundary (e.g., source and destination are in different or separate clouds remote from each other).

The source side includes a set of compute nodes 212, source object store 215, key-value (KV) store 218, and message queues (MQ) 221. One or more of nodes 212 is designated as a controller (Ctl) 224 and others of one or more nodes 212 are designated as source worker nodes (RSrc) 227A-C. There can be any number of source worker nodes and the number of source worker nodes can change dynamically. The MQ is connected between the controller and source worker nodes. The controller is connected to the source object store and key-value store.

The destination side includes a load balancer (LB) 230, a set of compute nodes 233, and a destination object store 236. One or more of nodes 233 are designated as destination worker nodes (RDst) 239A-D. There can be any number of destination worker nodes and the number of destination worker nodes can change dynamically. In another specific embodiment, the destination side further includes message queues 242 and a set of backend (BE) worker nodes 245. MQ 242 and the backend worker nodes are shown within a broken line box 248 to indicate that these components are optional and not included in some embodiments.

The source side, destination side, or both may include a cloud computing site in which compute and storage resources may be dynamically provided. Examples of clouds include Azure as provided by Microsoft, Amazon Web Service (AWS) as provided by Amazon, Google Cloud as provided by Google, and Pivotal Cloud Foundry as provided by the Cloud Foundry Foundation, among many others. The source side may include a source cloud site where the repository begins and the destination side may include a destination cloud site where the repository is copied to during replication. The source and destination designations may be reversed for recovery events or complicated replication topologies.

The controller is the node responsible for managing the replication including scheduling the replication, identifying changes to replicate, creating snapshots (or maintaining a log of changes), determining and generating the tasks that need to be performed, and passing the tasks to worker nodes. In a specific embodiment, there is a single node designated the controller. In another specific embodiment, there can be multiple nodes designated as controller nodes where each controller can manage a portion of a replication job. For example, one controller may be responsible for calculating a delta between a first portion of first and second snapshots. Another controller may be responsible for calculating another delta between a second portion of the first and second snapshots. Different controllers may handle different replication events. The worker nodes (e.g., source and destination worker nodes) are responsible for performing a replication task such as replicating or deleting an object (source/destination side).

The message queue receives and stores messages for retrieval. Controllers communicate with worker nodes through a message queue within the same cloud site. The number of worker nodes can grow or shrink. A source worker node may communicate across the Internet or other boundary to a load balancer at the destination side. The load balancer selects a destination worker node to be paired with the source worker node to complete the replication task. After the destination worker node has been selected and the initial handshake has been performed between the source and destination worker nodes, there can be a direct connection or channel between the source and destination worker nodes such that later calls and replies do not have to pass through the load balancer. The object storage provides persistent storage for objects. Object storage has a different protocol than a file system, and latency may be 100 s of milliseconds per operation.

In a specific embodiment, a replication technique is as follows. Beginning on the source side, there is a worker node designated as the controller (Ctl) as well as one or more worker nodes indicated as RSrc in FIG. 2 that communicate with the controller through a message queue. To perform replication, the controller determines that it should begin replication of particular objects, creates a snapshot 252 of the current storage state, calculates the differences since the last replicated snapshot, assigns replication tasks to worker nodes, and tracks the progress of replication.

More particularly, replication can be run on multiple scheduling options 255. A user could initiate a single replication event manually using a command line interface or graphical user interface (GUI). Alternatively, a user could schedule on-going replications. Potential schedules can include every 15 minutes, hourly, and daily, or at any other frequency as desired. The controller determines when to next perform replication and schedules the task to begin at the appropriate time, which could be immediately for a single replication event started by the user. The schedule may be maintained and controlled internally or externally to the replication system. For example, in another specific embodiment, the schedule may be maintained and controlled in a backup application that is separate from the replication system.

When a user establishes replication (once or on a schedule), the user also specifies which objects should be replicated. A user may specify a complete domain or deduplication domain, a portion of a domain, bucket, a portion of a bucket, partition, a portion of a partition, or a prefix string such that any object name that matches the prefix will be replicated. A bucket in object storage is a partition of the object storage space. A user can create, list, and delete buckets, and objects are written to and read from a specific bucket. Buckets are supported in the replication microservice system.

As compared to a file system, a bucket cannot container another bucket, so buckets are different from folders in a file system. As another example, object storage, unlike file storage, does not employ directories, subdirectories, and so forth for storage. Rather, in object storage, the data is bundled into an object along with customizable meta-data tags and a unique identifier, and the objects are stored in a flat address space. In some cases, in order to mimic a directory or folder structure in object storage, users may form object names in a hierarchical manner such that a prefix corresponds to a directory path (e.g. "backup/<username>/<foldername>"). Other, more complicated mechanisms for selecting objects to be replicated are possible. For example, regular expressions may be created using wildcard characters, other sequences of characters, strings, quantifiers, relational operators, and the like to define a search pattern to match against object meta-data.

The controller creates a snapshot of the current state of the object storage on the source. There are numerous ways to create or generate snapshots. In a specific embodiment, creating a snapshot includes flushing state to object storage and calling a list function to obtain a listing of objects in object storage. In a specific embodiment, creating a snapshot includes copying the identifying names of the objects into a snapshot structure or data structure.

In a specific embodiment, a snapshot includes a list of the names (e.g., unique identifiers) of the object recipes. For example, as discussed above, in a specific embodiment, clients write objects to the microservice. The microservice, in turn, internally generates a larger number of smaller objects that are stored to object storage. For a client-written object, there is one object recipe and many other objects such as slice recipes, similarity groups, and compression regions stored to object storage. In this specific embodiment, the snapshot thus includes of a list of the names (unique identifiers) of the object recipes. An object recipe name may include the user-generated name of the corresponding object and a timestamp indicating when the object was created or written to object storage.

In another specific embodiment, a log of object writes and deletions is maintained. With a log, changes to source object storage are logged as part of an on-going process. Thus, there may be no need to flush state or make calls to list objects stored in object storage—both of which may require time to process. A factor to consider in deciding between a log and snapshot is how incoming user operations interact with the creation of the snapshot, which could take seconds to many minutes to generate. A snapshot can require an affirmative action to create. A log may require considerations regarding consistency, efficiency, and storage location (e.g., held in memory or persisted in another location).

In a specific embodiment, generating a snapshot does not include pausing or blocking any user operations while copying the object recipe names of the existing objects into a snapshot structure. Users may be in the process of writing and deleting objects over the time that it takes to create a snapshot, and user operations are not paused while creating a snapshot. The reason is that in many cases replication is an ongoing task. So, it may not be critical in this scenario that the current snapshot has the up-to-the-second state, since another round of replication will take place according to the replication schedule. Thus, for example, a snapshot marked as having been created and corresponding to a point-in-time may not necessarily include object changes made immediately before or substantially close to that point-in-time. The snapshot may, for example, list an object as being present on source object storage, but the object may actually have been deleted around the time the snapshot was being created. There can be some inconsistencies between source and destination object storage. In this case, the object may remain on destination object storage until a next replication event even though the object has been deleted from source object storage.

Alternatively, in other cases a user may require or desire more exact replication, so a snapshot with stronger guarantees may be used. In that case, in-progress user initiated writes and deletions are either paused or allowed to complete and the result is incorporated into the snapshot. In an embodiment, the system is flexible so that users (e.g., administrators) may configure the system with weak or strong snapshot guarantees for consistency. A weak guarantee can provide higher performance (in return for looser consistency) by allowing transactions and writes to continue and proceed while a snapshot is being created.

After a snapshot is generated, the controller determines what has changed since the last snapshot so the changes will be replicated to the destination. In an embodiment, the previous or last snapshot is maintained so that this calculation can be performed. As time progresses, older or earlier snapshots may be deleted or replaced with newer snapshots in order to conserve storage space. For example, in a specific embodiment, a single previous snapshot of the source object storage may be maintained. At a beginning of a replication period, a current snapshot of the source object storage is generated to compare against the previous snapshot and identify changes. Once the changes have been identified, the previous older snapshot may be deleted and the current snapshot may then be maintained until a next replication period.

In a specific embodiment, snapshots include a sorted list of unique names for objects selected for replication. In a specific embodiment, the object names or object meta-data include the time when the object is stored. So, if an object is deleted and rewritten or simply rewritten with updates, it will have a more recent timestamp than the earlier version.

The controller (or a node given the task by the controller) begins reading in the two snapshots (e.g., previous and current snapshots), which may not fit in memory, so they can be read in pieces. If an object name exists in both snapshots, it does not need to be replicated since it was already replicated. If an object name exists in the older snapshot and not the newer snapshot, then the object has been deleted since the last snapshot and a task is created to delete the object from the destination. If an object name exists in the newer snapshot and not the older snapshot, then the object was written since the last snapshot and a task is created to replicate the object to the destination. For different snapshot designs, the protocol changes to determine which objects should be replicated or deleted. Referring back to FIG. 2, tasks are inserted 265 into the message queue (MQ) and worker nodes pull off 268 tasks to complete.

In a specific embodiment, the replication protocol begins by a source worker node pulling a task off of the MQ. The source worker node then initiates a connection 271 with the destination. A load balancer at the destination receives the connection request and assigns 274 the connection to a destination worker node that then has a direct communication path 277 with the source worker node. For example, source worker node 227C will have a direct communication path with destination worker node 239A. The direct communication path may bypass the load balancer. The two worker nodes perform a handshake step to confirm they are running compatible versions of the code as well as authenticating with an access key. If the task is to delete an object, the source worker then calls a function on the destination worker to delete the object.

If the task is to replicate an object, several steps are performed to reduce the amount of data transferred across the network. More particularly, in a specific embodiment, an object is represented in a deduplicated object store with an object recipe, which references a list of slice recipes, where a slice recipe in turn references an array of segments by fingerprint. In a specific embodiment, slices recipes span approximately 8 megabytes (MB) in size, with boundaries selected in a content-defined manner to align with segment boundaries, where segments are approximately 8 kilobytes (KB) in size and also formed in a content-defined manner, so a slice recipe has approximately 1,000 segments. A fingerprint is a content-based hash of the segment content such as a Secure Hash Algorithm 1 (SHA1) hash. (see, e.g., FIGS. 14A-D and the accompanying discussion).

In this specific embodiment, the source worker node first asks the destination worker node to check whether the object already exists on the destination object storage. Since objects have unique keys, this value can be checked by the destination along with a checksum or secure hash and object size for further verification. If the object already exists at the destination object storage, replication is complete.

If the object does not exist at the destination object storage, which is the likely case because of the snapshot comparison step previously described, then the source worker node enters a loop querying the destination worker node with each slice recipe. The destination worker node checks whether the fingerprints in the slice recipe already exist on the destination object storage. A technique for making this fingerprint existence check efficient is further described in U.S. patent application Ser. No. 15/486,430, filed Apr. 13, 2017, entitled "Micro-Service Based Deduplication, and U.S. patent application Ser. No. 15/486,609, filed Apr. 13, 2017, entitled "WAN Optimized Micro-Service Based Deduplication," all of which are incorporated by reference along with all other references cited herein.

Briefly, each recipe slice is represented by a numeric value called a sketch, which maps to a similarity group including slice recipes that are deemed similar. The similarity group holds the set of fingerprints for the slice recipes, and it can be loaded efficiently by a worker node. While this technique allows some duplicate fingerprints across similarity groups, it tends to find most duplicates in an efficient manner.

The destination worker node responds to the source worker node with the set of missing fingerprints that do not yet exist on the destination object storage. The source worker node then reads in the needed segments for the slice recipe into a buffer, compresses the buffer to form a compression region, and transfers the slice recipe and compression region to the destination worker node, which stores both in the destination object storage. When all slice recipes and their corresponding segments are transferred to the destination worker node, the source worker node then sends the object recipe, which is stored, and replication of the object is complete.

In a specific embodiment, to further improve efficiency, a batching of messages is performed. In this specific embodiment, given a specified batch size, such as 4 MB, the source nodes will group together slice recipes until the batch is full and then transfer the batch. The destination nodes then process all slice recipes in the batch and responds with all of the missing fingerprints across the slice recipes in the batch. Similarly, compression regions can be grouped into batches to be transferred. Since slice recipes tend to be around 32 KB in size, about 128 slice recipes can be packed into a 4 MB package and that many round trip network calls can be saved. For compression regions, the savings depends highly on the deduplication and compression ratios, since compression regions are around 4 MB in size without the impact of deduplication during replication.

When the destination worker nodes receives compression regions and slice recipes to store in object storage, either the destination replication worker can perform the writes directly, or it can pass the data through a MQ (e.g., MQ 242) to the backend (BE) worker nodes, as shown as an optional part 248 of FIG. 2.

In a specific embodiment, the RDst nodes write to destination object storage directly 258. If, however, writing becomes a bottleneck, it may be more efficient to pass the task to BE worker nodes that are already designed to write to object storage.

Replication may complete very quickly if there are few changes to transfer, or it could run for an extended period if there are many objects to transfer, the network bandwidth is low, or both. During this time, customers may want to know the status of replication, and it is also possible that nodes may fail. So it is desirable to track replication progress both for reporting and to support restarting replication.

In a specific embodiment, logging is handled on the source side. As the source worker nodes make progress on replication, they send status update messages 280 through the MQ back to the controller. Status messages include: object replication has begun, the number of slices transferred, replication is complete, object deletion has completed, or an error has occurred. The controller can track 283 these messages and make various decisions about processing. The message queue may include multiple queues including a first queue and a second queue. The first queue may include replication tasks generated by the controller. The controller may place the tasks onto the first queue for retrieval by the source worker nodes. The second queue may include task status update messages sent by the source worker nodes for the controller to retrieve and log into a key-value store.

By logging status 286 in a key-value store for persistence, replication can be efficiently restarted under a variety of failure scenarios. If a source worker node has stopped sending messages, the controller may choose to restart replication/deletion for an object in progress. If an error occurs, the controller may send a message to the system administrator or customer.

After a controller has crashed, a new controller can check the key-value store for replication status. It can begin calculating the changes in the current snapshot relative to the previous snapshot. By checking the logged status, the controller can determine which objects and deletions have already been replicated and begin replicating/deleting where it last stopped. Also, if a large object is partially replicated, as indicated by a log message about the number of slice recipes replicated, replication for the object can continue from where it stopped instead of starting over. This can save a large amount of time and network bandwidth relative to beginning replication over again for all objects in the new snapshot. In this design, all of the logging and restart functionality is on the source. A benefit is that while the destination side needs to maintain that worker nodes are available, the destination side does not otherwise need to track replication status. In another specific embodiment, replication status may be tracked by nodes on the destination side or tracking replication status may be shared between nodes on the source and destination side.

In a specific embodiment, a pair of worker nodes including a source worker node (RSrc) and destination worker node (RDst) will complete a single object replication, i.e., transferring of all slices and compression regions for the object will be handled by the fixed pair. The source worker node (RSrc) periodically updates progress to the message queue (MQ) 221. The controller (Ctl) pulls 283 progress update messages from the MQ and updates 286 the key-value (K-V) store with the status update messages. The controller (Ctl) performs snapshots and delta computation defined by a replication schedule.

In a specific embodiment, the destination worker node (RDst) writes directly to the object store of the destination side. Alternatively, in another specific embodiment, the destination worker node sends input/output (TO) messages via MQ 242 to the backends (BEs) for object store access. As discussed above, this can be an optional process to increase concurrency and distribute loads.

The replication architecture design as implemented within a cloud computing environment supports dynamically allocating compute nodes as needed. For replication, this is desirable feature. Specifically, in between replication periods, replication worker nodes can be turned off to save computation costs. Additionally, the controller node itself may be turned off provided there is a separate mechanism to restart the controller node when the next replication cycle should begin.

Similarly, at the destination side, destination worker nodes can be turned off when not needed and worker nodes restarted as replication tasks become available. The number of worker nodes allocated at any one time depends upon many different factors and combinations of factors. In a specific embodiment, there is a preconfigured number of worker nodes on both the source and destination.

In another specific embodiment, the number of worker nodes on the source side, destination side, or both is dynamic. In a specific embodiment, as the controller pushes tasks into the message queue, the controller tracks the depth of the message queue. As the depth exceeds a threshold, the controller can start another worker node to process tasks. Instead or additionally, the controller may calculate the number of objects to replicate and their sizes and allocate a number of worker nodes to complete replication in the desired time period. Other constraints that may be considered include I/O and network capabilities of the nodes as well as their cost. These may be stated as constraints the controllers should not exceed. If certain data sets are deemed higher priority than others, the controller may allocate more worker nodes for the high priority replication tasks.

As discussed, in a specific embodiment, replication is between a source and destination with worker nodes on both sides. Alternatively, in another specific embodiment, systems and techniques are provided to efficiently transfer one or more objects without the need for a cluster of nodes on the source. In this specific embodiment, a tool is provided for installation at a client computer having the object or file to replicate. The tool takes as parameters a destination cluster (e.g., Internet Protocol (IP) address and port), authentication key, and local file (or input stream) to transfer. The input may be provided via a command line interface, GUI, configuration file, or combinations of these.

The tool forms slice recipes for the file in a streaming manner (without storing anything extra locally) and begins the replication protocol previously described to transfer an object to the destination. If there are duplicate segments identified, then there will be network bandwidth savings. An advantage of this tool over the previously described cluster approach, is that it can be run on desktops, laptops, servers, etc. and efficiently transfer objects to cloud storage without configuring and running a local cluster of storage nodes to act as a source.

Figure 3:
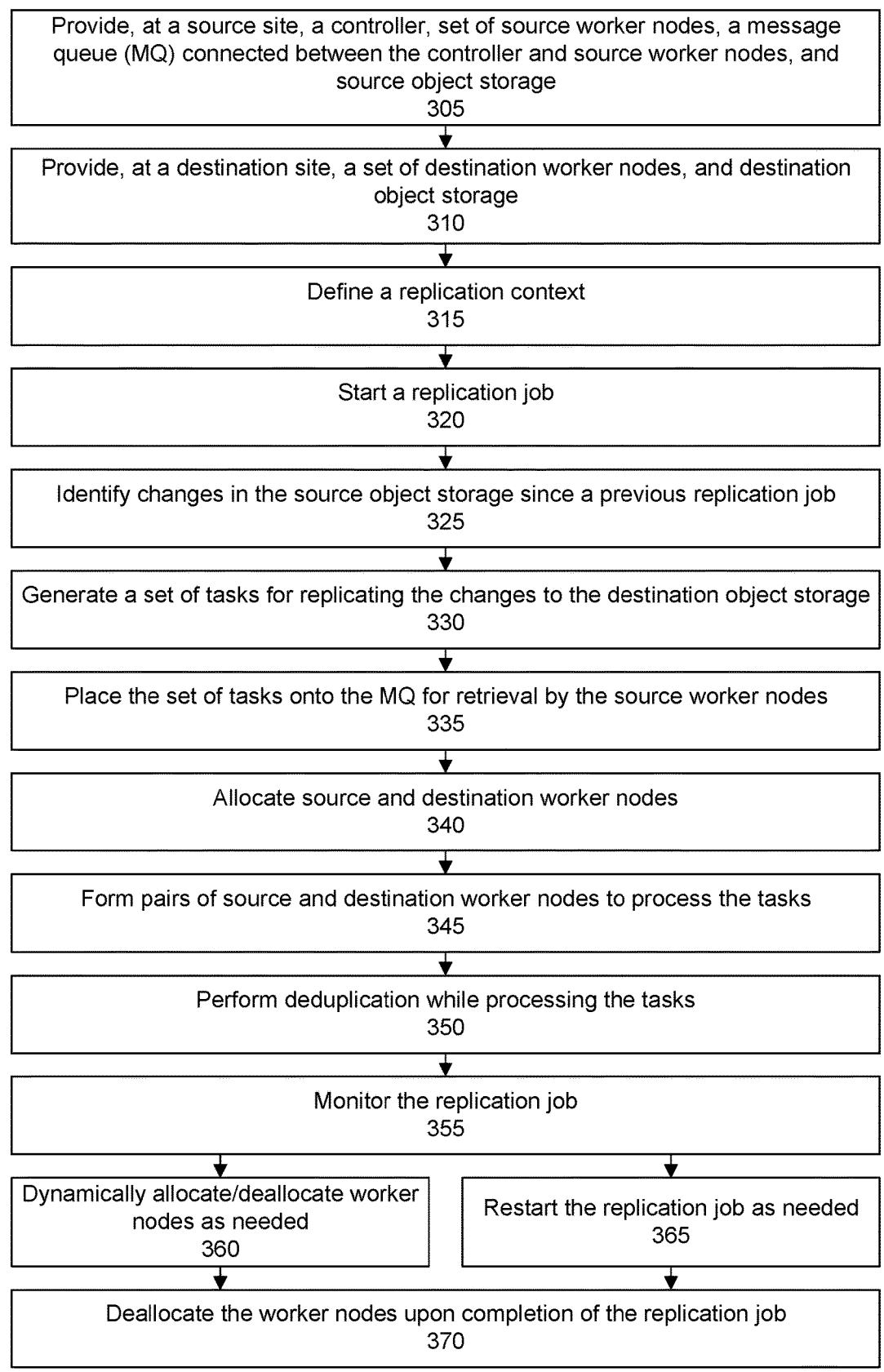
FIG. 3 shows an overall flowchart of a system for distributed object replication in accordance with one or more embodiments.

FIG. 3 shows an overall flow for replicating according to a specific embodiment. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 305, a source site is provided with a controller, a set of source worker nodes, a message queue connected between the controller and source worker nodes, and a source object storage. In a step 310, a destination site is provided with a set of destination worker nodes, and a destination object storage.

In a step 315, a replication context is defined. The replication context specifies the objects to replicate and the conditions under which replication should (or should not) occur. In a specific embodiment, defining the replication context may include identifying the data set or objects at the source object storage that should be replicated to the destination object storage, defining the frequency at which replication should be performed, scheduling a time window within which replication should be performed, assigning or setting a priority to the replication context, or combinations of these.

As discussed, there can be multiple scheduling options as well as combinations of options that a user may configure by GUI or programming API. Replication may be a single replication event. Alternatively, the user may schedule an on-going replication that occurs, for example, every 15 minutes, hourly, daily, and so forth. A data set of objects to replicate may be specified as a full deduplication domain, bucket of objects, prefix string (e.g., includes all objects with matching prefix in their names), multiple prefix strings, selected objects, and so forth.

More particularly, a user may define, for example, first and second replication contexts. The first replication context may identify a first set of objects and may be assigned a first priority. The second replication context may identify a second set of objects, different from the first set of objects, and may be assigned a second priority, different from the first priority. A level of the first priority may be higher than a level of the second priority. The replication context having the higher priority may be processed before the replication context having the lower priority. For example, in cases of conflict, such as a scheduling conflict or resource conflict, the replication context having the higher priority may be processed before the replication context with the lower priority.

Defining the replication context may include defining one or more constraints to be associated with a replication context. A constraint may include budget constraint, time constraint, or both. For example, a user may specify that a replication job is to not exceed a threshold cost. A user may specify that a replication job is to not exceed a permitted threshold time period. The system may include minimizing functions, maximizing functions, or both. In a specific embodiment, the system may perform a cost-minimization analysis to evaluate a set of replication options and automatically select an option that has the lowest cost. For example, a cloud vendor may offer various pricing options, rates, and schedules based on a number of nodes allocated, compute capability of a node to be allocated, duration of time that a node is allocated, and so forth. One option may be to rent a large number of nodes so that replication can be completed in a short time period. Another option may be to rent a small number of nodes for a longer time period. The system can perform a cost-minimization analysis of the different options to automatically select the option that is least expensive.

As another example, some cloud vendors may provide spot pricing in which the cost of a node may vary. In a specific embodiment, a user may configure a replication context to enable spot pricing. In this specific embodiment, the system may monitor the prices at the cloud site. When, for example, the price to rent a node falls below a user-configured threshold price, the system may initiate replication. Instead or additionally, when, for example, the price to rent a node is above a user-configured threshold price, the system may halt or pause replication even if a replication job is not complete. In this case, the replication job may resume after the price falls below the threshold price.

In a step 320, a replication job is started. As discussed, in a specific embodiment, replication is triggered according a time schedule. In other embodiments, replication may be triggered upon the occurrence of a different event (e.g., price of a node falls below a threshold price, or on-demand request from a user) or combination of different events.

In a step 325, the controller identifies changes to the source object storage since a previous replication of the source object storage. In a step 330, the controller generates a set of tasks for replicating the changes made to the source object storage to the destination object storage. In a step 335, the controller places the set of tasks onto the message queue for retrieval by a set of source worker nodes.

In a step 340, an initial number of source and destination worker nodes are allocated. The number of source worker nodes allocated may be the same as the number of destination worker nodes allocated as source and destination worker nodes work in pairs and coordinate with each other to process and complete replication tasks. Alternatively, the number of source worker nodes may be different from the number of destination worker nodes. The number of worker nodes to initially allocate may be calculated dynamically.

In a step 345, pairs of source and destination worker nodes are formed to process and complete the tasks. In a step 350, deduplication is performed while processing the tasks. In a specific embodiment, there is a micro-service for reads and writes that has multiple frontends, message queues, and backends. The frontends break an incoming object into segments (~8 KB) and slices (~8 MB) that align with segment boundaries. These are handed off through the message queue to backends that calculate SHA1 fingerprints, sketch slices (produce a numeric value used to find similar slices), and check a meta-data service (also called a similarity index) to find a similarity group with the same sketch value. Deduplication for the slice is performed against the similarity group. Any segments that are not duplicates are concatenated together and compressed into a compression region. Compression regions, slice recipes, similarity groups, and object recipes (referencing slices) are stored to object storage. Frontends, backends, and message queues can scale based on demand. Further discussion is provided below.

In a step 355, the replication job is monitored. Based on the monitoring, additional new worker nodes may be allocated or existing worker nodes may be deallocated (step 360). Alternatively, if a problem is encountered that results in the replication job terminating prior to completion, a task not being successfully completed, or both, the replication job may be restarted with tasks not yet processed while tasks that have already been processed are not reprocessed (step 365).

In a step 370, the worker nodes may be deallocated upon completion of the replication job. One or more controller nodes may also be deallocated.

Figure 4:
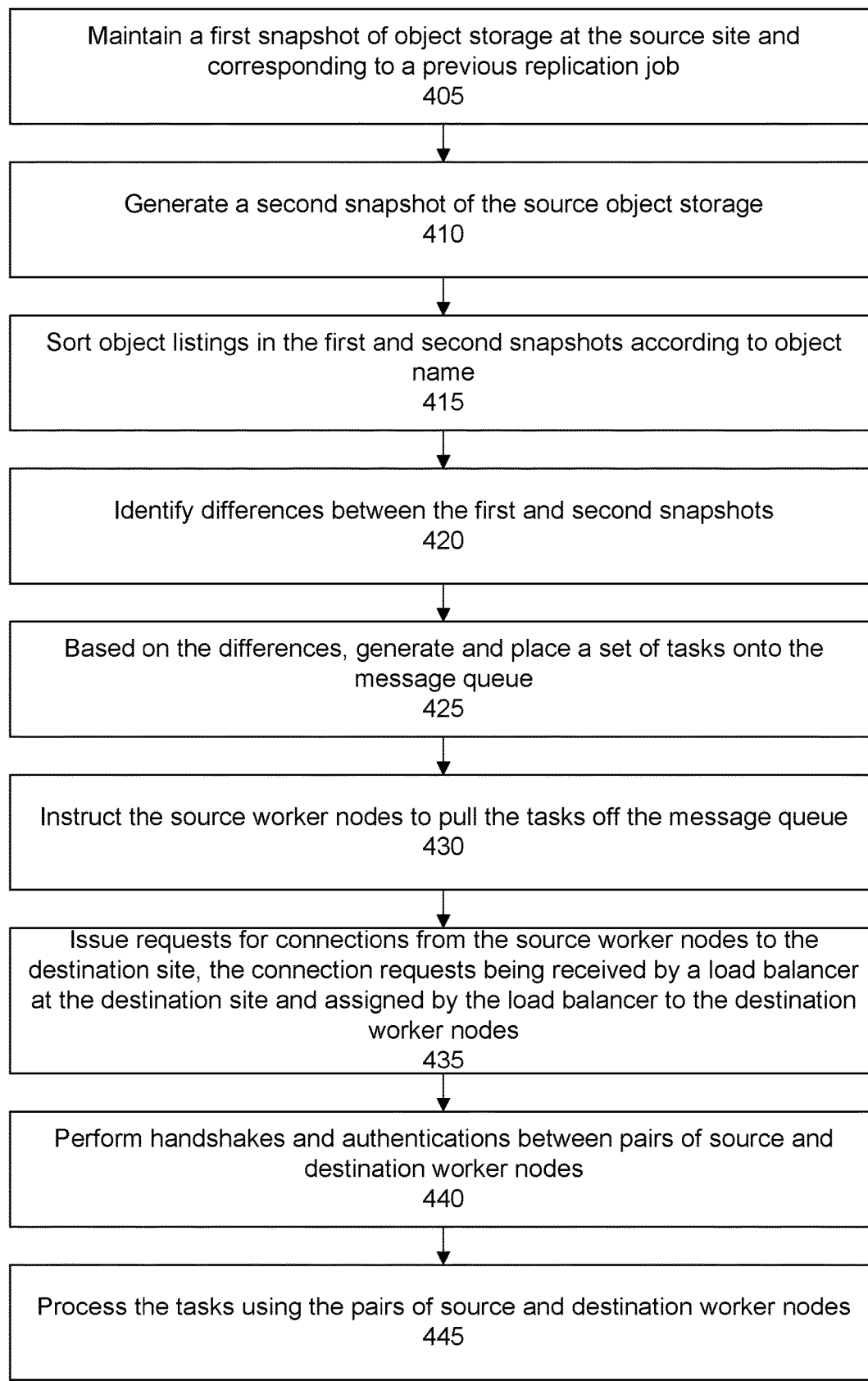
FIG. 4 shows further flowchart detail of a system for distributed object replication in accordance with one or more embodiments.

FIG. 4 shows further detail of a flow for identifying changes to replicate and forming pairs of source and destination worker nodes to process the replication tasks. In a specific embodiment, the replication protocol is snapshot based. Other options are possible (e.g., creating a log of object creations and deletions). In a specific embodiment, the controller creates a snapshot of the current state of the data to be replicated (full domain, objects matching a prefix string, multiple prefix strings, or selected objects). The current snapshot includes the names of all objects in the replication context on the source. Names may include the user-generated name as well as the time of creation. Object names are sorted in the snapshot. In a specific embodiment, user operations during snapshot creation are not blocked.

Figures 5, 6, 7:
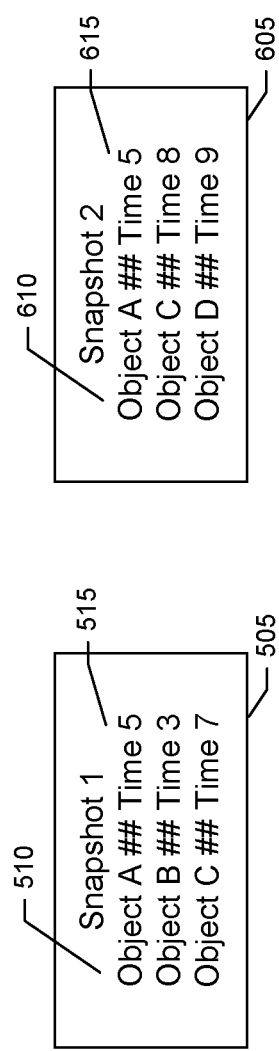
FIG. 5 shows an example of a first snapshot taken of an object storage at a first time in accordance with one or more embodiments.
FIG. 6 shows an example of a second snapshot taken of the object storage at a second time, after the first time in accordance with one or more embodiments.
FIG. 7 shows an example of generated tasks in accordance with one or more embodiments.

More particularly, in a step 405, a first snapshot of object storage at a source site and corresponding to a previous replication job is maintained. FIG. 5 shows an example of a first snapshot 505 taken of a source object storage at a first time. In a specific embodiment, the first snapshot includes a data structure listing object recipe names 510 of objects stored on source object storage and timestamps 515 corresponding to the listed objects.

The listing of objects in the snapshot include those objects stored on source object storage that are to be replicated to destination object storage according to a particular replication context. For example, in a specific embodiment, a replication context may be defined that identifies a listing of objects to replicate. A snapshot of the source object storage may be generated by comparing object names listed or otherwise identified in the replication context with object names from the source object storage to determine whether an object listed in the source object storage should be added to the snapshot. If the object names match, the object name and other meta-data such as the timestamp may be added to the snapshot. A timestamp may specify the time and date that the object was last modified. A timestamp may include a calendar day, hour, minute, second, and even millisecond that the object was last modified. If the object names do not match, the object name may not be added to the snapshot. That is, the object may be omitted or excluded from the snapshot.

In a step 410 (FIG. 4), upon a replication being triggered, the controller generates a second snapshot of the source object storage at a second time, after the first time. FIG. 6 shows an example of a second snapshot 605 taken of the source object storage at the second time. The second snapshot may be generated using a technique similar to generating the first snapshot. In particular, the second snapshot includes a data structure listing object recipe names 610 and timestamps 615 corresponding to the listed objects.

In a step 415 (FIG. 4), the entries in the first and second snapshots are sorted according to object recipe name. In a specific embodiment, the objects are sorted alphabetically. Alphabetical order is a system whereby strings of characters are placed in order based on the position of the characters in the conventional ordering of an alphabet. To determine which of two strings of object names in a snapshot comes first in alphabetical order, their first letters are compared. If they differ, then the string whose first letter comes earlier in the alphabet comes before the other string. If the first letters are the same, then the second letters are compared, and so on. If a position is reached where one object name string has no more letters to compare while the other does, then the first (shorter) object name string may be deemed to come first in alphabetical order. In a specific embodiment, the underlying object storage system returns to the microservice a list of objects in alphabetical order matching a prefix as a response to a List command.

FIGS. 5-6 show examples where the objects (or, more particularly, the object recipe names) listed in the first and second snapshots have been sorted alphabetically. Alternatively, the listing of objects may be sorted reverse alphabetically, according to a different key, or both so long as the type of sort is applied consistently across both snapshots.

In a step 420 (FIG. 4), differences between the first and second snapshots are identified. In a step 425, based on the differences, the controller generates and places a set of tasks onto the message queue for the source worker nodes to retrieve, pull, fetch, or obtain.

More specifically, the controller determines what has changed on the source object storage and needs to be replicated. A change may include objects or portions of objects written to the source object storage. A change may include objects or portions of objects deleted from the source object storage. The controller preserves the previous snapshot (from the last replication event) and calculates a delta of the current snapshot relative to the previous snapshot. Object names in the snapshot include their creation time. The two snapshots are read into memory (possibly in pieces) and compared. If an object name and timestamp exists in both snapshots, it does not need to be replicated. If an object exists in the older snapshot and not the newer snapshot, then a deletion task is generated. If an object exists in the newer snapshot and not the older snapshot, then a replication task is generated. Tasks are inserted into the message queue for worker nodes to complete.

Consider again the snapshot examples shown in FIGS. 5 and 6. The first snapshot lists an object recipe having a name that includes the user-generated object name "Obj A," reserved symbols "##," and a corresponding timestamp of "Time 5." The second snapshot also lists an object recipe having a name that includes the user-generated object name "Obj A," reserved symbols "##," and a same corresponding timestamp of "Time 5." Thus, in this example, "Obj A" does not need to be replicated or deleted because there have been no changes to the object as indicated by the timestamp.

The first snapshot further lists an object recipe having a name that includes the user-generated object name "Obj B," reserved symbols "##," and a corresponding timestamp of "Time 3." The second snapshot does not include a corresponding object recipe listing for object B. Thus, a determination is made that object B was deleted from the source object storage since the first snapshot and a task is generated to likewise delete object B from the destination object storage.

FIG. 7 shows an example of tasks 705 that may be generated. A task may include a short descriptive message of an action to be performed or instruction, an identification of an object associated with the action, other meta-data associated with the object (e.g., timestamp, size, or checksum), or combinations of these. As shown in the task listing, a first task 710 has been generated to delete object B having a corresponding timestamp "Time 3." Specifically, the first task includes an object recipe name (e.g., "Object B ## Time 3") that identifies an object (e.g., Object B written at Time 3) and an action to be performed on the object (e.g., "Delete").

Referring back now to FIGS. 5-6, the first snapshot further lists an object recipe having a name that includes the user-generated object name "Obj C," reserved symbols "##," and a corresponding timestamp "Time 7." The second snapshot (FIG. 6) also lists an object recipe having a name that includes the user-generated object name "Obj C," reserved symbols "##," and corresponding timestamp "Time 8." In this example, a determination is made that "Obj C" was modified after the first snapshot because "Time 8" is after "Time 7." Thus, a second task 715 (FIG. 7) is generated to replicate "Obj C" with corresponding timestamp "Time 8" and added to the task list. Specifically, the second task includes an object recipe name (e.g., "Object C ## Time 8") that identifies an object (e.g., Object C written at Time 8) and an action to be performed on the object (e.g., "Replicate"). In a specific embodiment, a third task 716 to delete the object with the old timestamp (e.g., "Obj C" with timestamp "Time 7") is also generated in conjunction with the second task. In other words, the microservice system deletes the object with the old timestamp from the destination and copies the object with the new timestamp to the destination.

Referring back now to FIGS. 5-6, the second snapshot further lists an object recipe having a name that includes the user-generated object name "Obj D," reserved symbols "##," and a corresponding timestamp "Time 9." The first snapshot, however, does not list such an object recipe. In this example, a determination is made that object D was added to the source object storage after the first snapshot and should be replicated to destination object storage. Thus, a fourth task 720 (FIG. 7) is generated to replicate "Obj D" with corresponding timestamp "Time 9" and added to the task list. Specifically, the third task includes an object recipe name (e.g., "Object D ## Time 9") that identifies an object (e.g., Object D written at Time 9) and an action to be performed on the object (e.g., "Replicate").

As discussed, in a specific embodiment, after the snapshots are created, the entries are sorted alphabetically. The sorting helps to facilitate the snapshot comparison process by organizing the entries listing objects in the snapshot so that they may be in the same or approximately the same positions, locations, or areas between snapshots. For example, by sorting the first and second snapshots by object name, object A is at the top of the lists (see, e.g., FIGS. 5-6). The controller, when comparing the object listings in the snapshot, can compare an entry (e.g., initial entry) listing an object in the first snapshot with a corresponding entry (e.g., initial entry) listing an object in the second snapshot and thus can quickly locate the object (or determine that the object is not present) without having to conduct an extensive search through all of the entries.

In a step 430, the source worker nodes may be instructed to pull the tasks off the message queue for processing. The message queue may be a first in first out queue. In some embodiments, the controller may rearrange the tasks based on factors such as task priority, node capability, other factors, or combinations of these. For example, tasks having a high priority may be moved to a front of the queue. Tasks having a low priority may be moved to a backup of the queue. Other types of queues may instead or additionally be used.

A source worker node pulls a task off of the message queue. When the source worker node pulls the task off of the message queue, the source worker node may delete the task from the message queue or otherwise mark the task as having been taken or received, notify the controller (e.g., send status update message to queue indicating that task has been taken). This helps to ensure that other source worker nodes do not end up retrieving and processing the same task and frees space on the message queue for additional tasks to be added.

In a step 435, the source worker nodes issue requests for connections to the destination site. In a specific embodiment, the connection requests are initially received by a load balancer at the destination site. The load balancer assigns the connection request to a particular destination worker node. Any competent load balancing algorithm may be applied to balance the load across the worker nodes. Some examples of load balancing algorithms include round robin, weighted round robin, random, least connections (weighted least connections), least traffic (weighted least traffic), least latency, and others.

In a step 440, handshakes and authentications are performed between pairs of source and destination worker nodes. In a specific embodiment, a source worker node of a pair provides an authentication key to a destination worker node of the pair. The destination worker node authenticates the key in order to verify that the requested connection is from a legitimate source worker node and thus authorized to access and change the data at the destination object storage.

In other words, the source worker node initiates a connection with the destination. A load balancer at the destination receives the connection request and assigns the connection to a destination worker node as a direct communication path. The two workers establish a connection by performing a handshake, confirming compatible code versions, authenticating with a key, and performing other initialization work.

In a step 445, the tasks are processed using the pairs of source and destination worker nodes. When a pair of worker nodes complete the processing of a task, a source worker node may retrieve another task from the message queue to process. In a specific embodiment, the source worker node coordinates with the same destination worker node that the source worker node was paired with during processing of the prior task. In this specific embodiment, the direct connection between the source and destination worker nodes may be maintained for the processing of the next task so that there is no need to pass through the load balancer and perform another handshake. In another specific embodiment, once a particular task is completed, the direct connection between the source and destination worker nodes is terminated. In this specific embodiment, when the source worker node retrieves another task from the message queue, the source worker node will again issue a connection request that is received by the load balancer. The load balancer may assign the request to a different or same destination worker node that the source worker node was paired with for the previous task, and a handshake may again occur.

The processing of a task may occur in parallel, concurrently, or simultaneously with the processing of other tasks. For example, there may be first and second pairs of source and destination worker nodes. While the first pair is processing a first task, the second pair may be processing a second task, different from the first task. Furthermore, a source worker node may process multiple tasks in parallel, using one or multiple destination worker nodes. A destination worker node may process multiple tasks in parallel, coming from one or more source worker nodes.

As discussed, in a specific embodiment, a pair of worker nodes including a source worker node and a destination worker node coordinate with each other to complete a single object replication. In another specific embodiment, object replication may involve more than one source worker node, more than one destination worker node, or both. Involving multiple worker nodes can be especially beneficial when the object to replicate is large. That is, a large object could be replicated by more than one source worker to more than one destination worker.

For example, the controller could decide to create a first task (replicate BigObject bytes 0-10 GB) and a second task (replicate BigObject bytes 10 GB+1 to 20 GB). A worker would receive this task and begin work. A mechanism is provided to track progress and also transfer the object recipe when the object is complete. As a further alternative, a source worker could make the decision to replicate a big object to multiple destination workers because of a mismatch in computational power between sites.

In a specific embodiment, a method may include creating, by a controller, a first task comprising replicating a first portion of an object; creating, by the controller, a second task comprising replicating a second portion of the object; placing, by the controller, the first and second tasks onto a message queue; retrieving, by a first source worker node, the first task; retrieving, by a second source worker node, the second task; forming a first pair of worker nodes the complete the first task where the first pair of worker nodes includes the first source worker node and a first destination worker node; forming a second pair of worker nodes to complete the second task where the second pair of worker nodes includes the second source worker node and a second destination worker node; tracking a progress of the first and second tasks; and when the first and second tasks are complete, transmitting an object recipe associated with the object from a source to a destination.

In another specific embodiment, a method may include creating, by a controller, a task to replicate an object; placing, by the controller, the task onto a message queue; retrieving, by a source worker node, the task; establishing a first connection between the source worker node and a first destination worker node; receiving an indication of computational power available to the first destination worker node; based on the computational power available to the first destination worker node, determining, by the source worker node, that at least a second destination worker node should assist in replicating the object; establishing a second connection between the source worker node and the at least second destination worker node; coordinating, by the source worker node, with the first destination worker node to replicate a first portion of the object; and coordinating, by the source worker node, with the at least second destination worker node to replicate a second portion of the object.

In a specific embodiment, the task does not identify the particular worker node that is to perform the task since there can be multiple worker nodes and any one worker node may retrieve the task depending upon the worker node's availability. In another specific embodiment, a task may be tagged with information specifying a particular worker node or type of worker node that is to perform the task. Some tasks may be better suited for particular types of worker nodes as compared to other tasks.

For example, a task to copy an object may require more processing than a task to delete an object. Thus, a task to copy an object may include a first attribute indicating that it is a copy task. A task to delete an object may include a second attribute indicating that it is a deletion task. Worker nodes, such as source worker nodes, may be classified as a first type or a second type. Source worker nodes of the first type may be configured with resources better suited for handling copy tasks as compared to source worker nodes of the second type. In this specific embodiment, a source worker node of the second type may first attempt to select a task from the message queue that is a deletion task before selecting a copy task. Conversely, a source worker node of the first type may first attempt to select a task from the message queue that is a copy task before selecting a deletion task.

As another example, a task to copy an object of a large size may require more processing than a task to copy an object of a smaller size. A task to copy an object may include an attribute specifying a size of the object to be copied. Worker nodes (e.g., source worker nodes, destination worker nodes, or both) may be classified or associated with a particular range of object sizes that the worker node is appropriately equipped or configured to handle. For example, a first group of source worker nodes may be associated with a first range of object sizes. A second group of source worker nodes may be associated with a second range of object sizes, different from the first range. In this specific embodiment, a source worker node of the first group may first attempt to select a copy task from the message queue where an object to be copied has a size that falls within the first range before selecting a copy task where an object to be copied has a size that falls outside the first range.

In this specific embodiment, tasks may not necessarily be retrieved in the order in which they were placed onto the message queue. For example, a message queue may include a first task placed onto the message queue at a first time, and a second task placed onto the message queue at a second time, after the first time. A source worker node may retrieve the second task and skip the first task even though the first task was placed onto the message queue before the second task. In other specific embodiment, tasks are retrieved in the order in which they were placed onto the message queue.

Instead or additionally, there can be destination worker nodes better suited for handling certain types of tasks as compared to other types of tasks. In a specific embodiment, a connection request received at the load balancer may include an attribute indicating a type of task associated with the connection request. In this specific embodiment, the load balancer may first attempt to assign the connection request to a destination worker node better configured to handle that type of task before assigning the request to a different type of destination worker node.

Referring back now to FIG. 3, it should be appreciated that one or more steps may be performed in parallel with or concurrently with one or more other steps. For example, as soon as a task is placed onto the message queue, a worker node may retrieve the task and begin processing. As soon as another task is placed onto the message queue, another worker node may retrieve the task and begin processing, and so forth. The worker nodes do not necessarily wait for the entire task list to be generated before beginning to retrieve and process tasks.

As another example, the message queue may have a limit on the number of tasks that can be held in the message queue. The controller, upon determining that the message queue is full, may pause calculating the snapshot delta until there is space on the message queue as the worker nodes complete their tasks and pull new tasks from the message queue.

The design of the microservice system allows for the processing of very large amounts of data even with a very limited amount of memory. For example, snapshots may include many millions or even billions of objects resulting in many millions or even billions of tasks. The memory available to the controller may not be sufficient to read in such large snapshots and generate the appropriate tasks at a given time—especially for an initial replication where the entire source object storage is to be replicated.

The controller may read in portions of the snapshots, calculate a portion of the snapshot delta, generate and place a subset of tasks onto the message queue for retrieval by the worker nodes, pause operations until at least some of the task have been processed and space has opened on the message queue, and then continue to read in other portions of the snapshot, calculate another portion of the snapshot delta, generate and place another subset of tasks on the message queue, and so forth.

Figure 8:
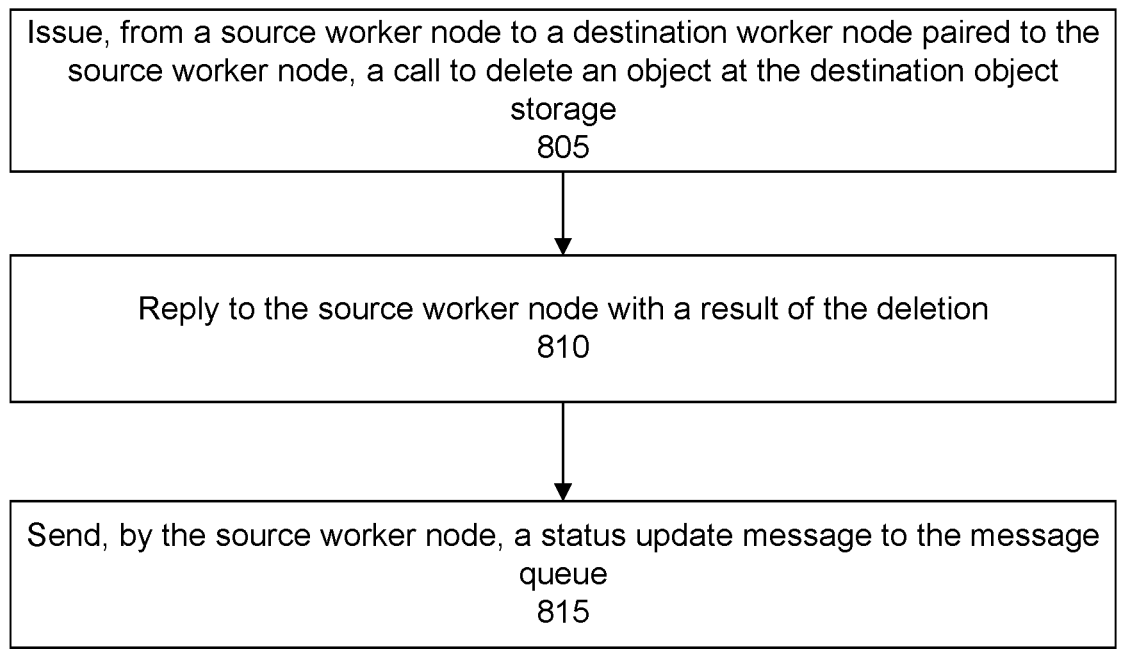
FIG. 8 shows a flowchart for deleting an object in accordance with one or more embodiments.
Figure 9:
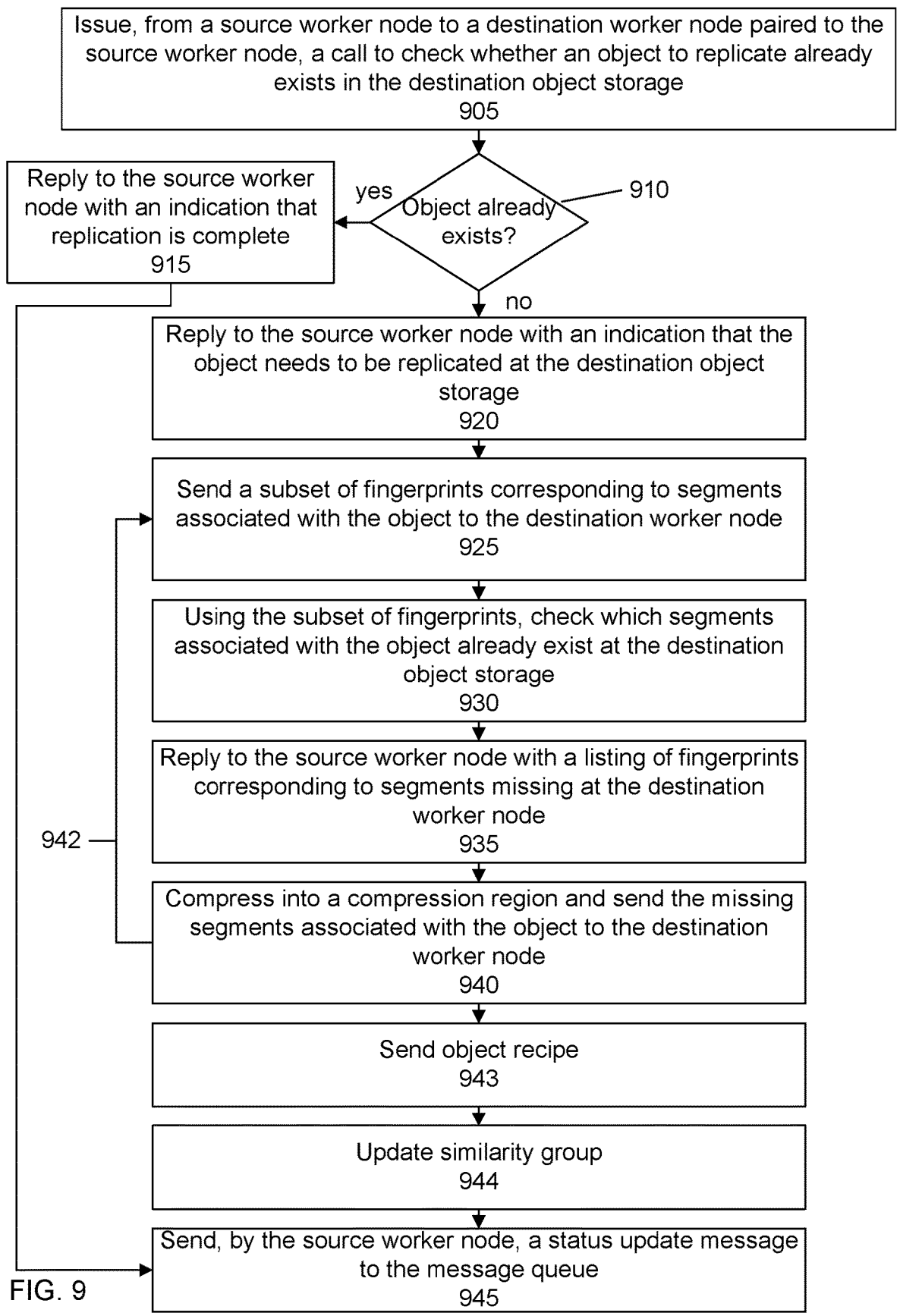
FIG. 9 shows a flowchart for replicating an object in accordance with one or more embodiments.

FIGS. 8-9 show further flow details for task processing. FIG. 8 shows a flow of a task for deleting an object. FIG. 9 shows a flow of a task for replicating an object or a portion of an object. Referring now to FIG. 8, if the task is to delete an object, the source makes a call (e.g., Remote Procedure Call (RPC)) to the destination to delete the object. Specifically, in a step 805, a source worker node issues a call to a destination worker node paired with the source worker node to delete an object at destination object storage. The destination worker node deletes the object at the destination object storage and returns a reply to the source worker node with a result of the deletion (step 810). In a step 815, the source worker node periodically sends status update messages to the message queue indicating, for example, that the task to delete the object was successfully completed, an error was encountered (e.g., object not present at destination object storage), deletion failed, and the like.

FIG. 9 shows a flow for processing a task to replicate an object. In a step 905, a source worker node issues a call to a destination worker node paired to the source worker node to check whether an object to replicate already exists at the destination object storage. In a step 910, the destination worker node checks whether or not the object already exists. In a specific embodiment, the source worker node identifies the object to be replicated by providing the destination worker node with a unique key or identifier identifying the object, a checksum of the object, a size of the object, or combinations of these.

The destination worker node scans the destination object storage to determine whether there already exists an object having the matching key and other meta-data information. If a determination is made that the object already exists at the destination object storage, the destination worker node returns a reply to the source worker node with an indication that the object already exists and replication is complete (step 915) and the source worker node sends a status update message to the message queue (step 945). This preliminary check helps to ensure that network bandwidth and compute resources are not expended replicating an object that already exists at the destination object storage.

Alternatively, if the destination object node determines that the object does not yet exist at the destination object storage (e.g., a matching object key not found), in a step 920, the destination worker node returns a reply to the source worker node with an indication that the object needs to be replicated at the destination object storage.

In an embodiment, a deduplication technique is applied in conjunction with the replication. The deduplication helps to reduce the amount of network bandwidth required to replicate an object. For example, in a step 925, the source worker node sends a subset of fingerprints corresponding to segments associated with the object to replicate to the destination worker node. In a step 930, the destination worker node uses the subset of fingerprints to check which segments associated with the object already exist at the destination object storage.

The destination worker node compares the received subset of fingerprints against, for example, a fingerprint index or listing at the destination object storage and corresponding to object segments already existing at the destination object storage. The destination worker node replies to the source worker node with a listing of those fingerprints not found at the destination object storage (step 935). These fingerprints thus correspond to segments of the object that are missing at the destination object storage.

In a step 940, the source worker node sends the missing segments (e.g., actual data content) associated with the object to the destination worker node for storage at destination object storage. In an embodiment, the missing segments are compressed before transfer (e.g., compressed into a compression region and sent). The process then loops back 942 so that steps 925-940 are repeated until all segments of the object to replicate have been checked. In a step 943, the object recipe corresponding to the replicated object is sent to the destination worker node and the similarity group is updated (step 944).

In a step 945, the source worker node periodically sends status update messages to the message queue throughout the processing of the task. The status messages may indicate, for example, that replication of an object or particular portion of the object has started, replication of the object or particular portion of the object has completed, replication is complete (e.g., all segments of the object have been checked and copied to the destination object storage as needed), and the like.

Thus, in a specific embodiment, the task to replicate an object involves a sequence of calls. In a specific embodiment, these calls are tied directly into a representation of objects in the system. In a specific embodiment, an object is represented with a recipe. The recipe references a list of slice recipes. A slice recipe includes an array of references to approximately 8 KB segments that span approximately 8 MB on average. A segment reference is a SHA1 hash and the segment size.

In this specific embodiment, replication is performed by transferring slice recipes to the destination worker node. The destination worker node checks to determine which segments are already stored (based on segment reference). In this specific embodiment, an incoming slice recipe is only compared against a similarity group that includes slices with the same sketch. In other words, a similarity group includes a set of slice recipes that have the same sketch and deduplication is performed against that set of slice recipes. Slice recipes are organized into similarity groups. In this specific embodiment, only slice recipes organized with a particular similarity group (having the same sketch) are considered when performing deduplication. The technique is an imperfect deduplication as duplicates may be written that could otherwise not have been written. However, the technique allows for caching and pre-fetching likely candidates for deduplication in order to strike a balance across efficient use of storage, network bandwidth, and processing time.

At the end of the replication procedure, the object is recreated at the destination (object recipe, slice recipe, compression regions of segments, and similarity group updates) while only transferring segments that did not already exist there. This process can be batched to reduce the number of round trip RPC calls. In another specific embodiment, the replication protocol is a stateless protocol that does not maintain information across RPC calls. Further discussion of the object representation is provided below and in U.S. patent application Ser. Nos. 15/486,430 and 15/486,609, which are incorporated by reference.

Figure 10:
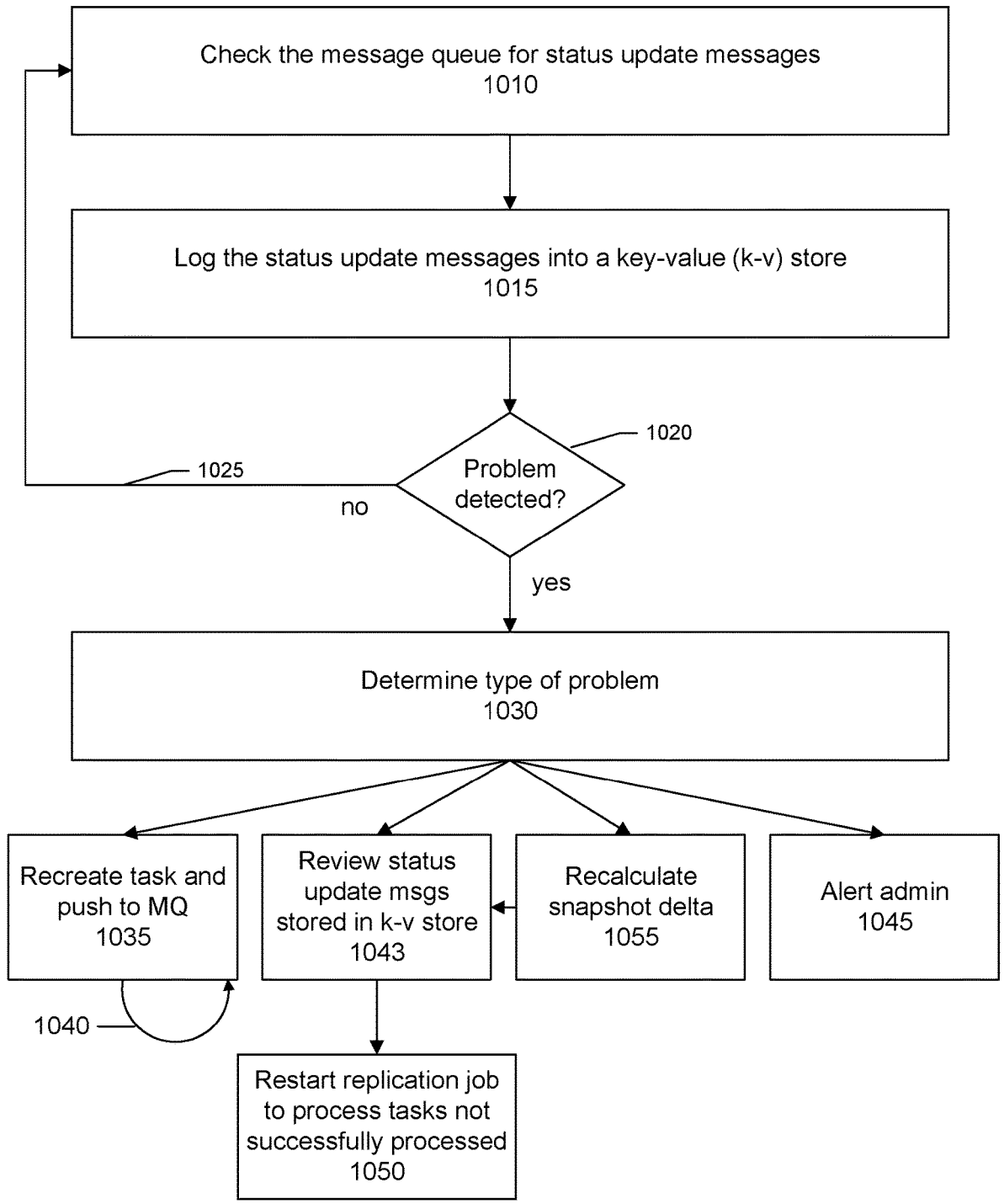
FIG. 10 shows a flowchart for tracking progress and restarting a replication job in accordance with one or more embodiments.

FIG. 10 shows a flow for tracking progress and restarting. Replication may complete quickly or take an extended period due to there being many objects to transfer, limited network bandwidth, or both. Customers want to know the status of replication. Problems, however, may be encountered during a replication job. For example, nodes including controller nodes, worker nodes, or both may fail. In a specific embodiment, progress is logged on the source side. Logging the progress on the source side helps to reduce the amount processing on the destination side.

In this specific embodiment, as a source worker makes progress, it sends a status update through the message queue to the controller. The controller logs the status in a key-value store for persistence. Status messages include: object replication has begun, the number of slices transferred, replication complete, object deletion has completed, or an error has occurred in various steps. A status message may include an identification of a source worker node that is handling a particular task, an identification of a destination worker node that the source worker node has been paired with, or both. If a source has stopped sending status messages, the controller may choose to create its task again. If an error has occurred, the controller may, after a number of retry attempts, alert an administrator. If replication of a large object fails in the middle, the controller can restart it from the last logged position. If a controller fails and restarts, it can recalculate the snapshot delta and check which tasks have completed in the key-value store to determine how to continue.

More particularly, in a step 1010, the controller periodically checks and reviews the message queue for status updated messages that have been reported by the various source worker nodes. The checking may be performed every 1, 2, 3, 4, or 5 seconds, or at any other frequency as desired. In a specific embodiment, there can be a message queue manager that manages multiple queues. A first message queue may be provided for the controller to pass tasks to the source worker nodes. A second message queue may be provided for the source worker nodes to pass status update messages to the controller.

In a step 1015, the controller logs the status update messages that have been posted to the message queue (e.g., second message queue) into a key-value store. For example, the controller may copy, move, or transfer the status update messages from the message queue and into the key-value store.

In a step 1020, a determination is made as to whether a problem has been detected. If no problems have been detected, the controller continues 1025 to periodically monitor and review the message queue and log the status messages into the key-value store.

Alternatively, if a problem has been detected, in a step 1030, a determination is made as to the type of problem that has been detected. Problems may include, for example, a source worker node having reported an error message, a source worker node not having reported status for a particular threshold period of time, one or more source worker nodes failing, a controller failing, and so forth. The error reported by the source worker node may concern a problem at the source worker node, a problem detected by a destination worker node paired to the source worker node and reported to the source worker node, or both.

Depending upon the type of problem detected, one or more remediation actions may be taken. For example, the controller may track, for each source worker node, an amount of time that elapsed since a source worker node last reported status. If the elapsed amount of time exceeds a threshold duration, the controller may recreate the task and again push the task to the message queue for retrieval by the same or different source worker node (step 1035). The controller may mark the non-responsive worker node as unavailable.

There can be different duration thresholds based on the type of task being processed. Some tasks may require more time to process than other tasks. For example, a task to copy an object may require more time than a task to delete an object. In a specific embodiment, there can be a first threshold duration associated with a task of a first type and a second threshold duration, different from the first threshold duration, associated with a task of a second type. In this specific embodiment, the controller may maintain a task assignment list identifying a task, task type, and worker node processing the task. If the worker node has not reported status and is processing a task of the first type, the controller may wait until the first threshold duration has elapsed before determining that a problem has occurred. If, however, the worker node is processing a task of the second type, the controller may wait until the second threshold duration has elapsed before determining that a problem has occurred.

If the error continues, the controller may retry 1040 processing the task a certain threshold number of times before alerting an administrator (step 1045). The threshold number of times to retry can be a user-configurable value. For example, the controller may be configured to retry 2, 3, 4, 5, or more than 5 times.

If, for example, replication of an object fails part way through, in a step 1043, the controller can review the status update messages stored in the key-value store to determine what tasks have already been successfully processed, which tasks have not been successfully processed, which portions of an object have been replicated, which portions of the object have not been replicated, and so forth. In a step 1050, the replication job can then be restarted to process the tasks not successfully processed and not reprocess the tasks that were successfully processed.

This restarting technique can be especially helpful when the object being replicated is particularly large. By reviewing the status update message in the key-value store, the controller can determine which portions of the object have been replicated to the destination object storage and which portions of the object have not been replicated to the destination object store. Tasks can then be generated to replicate those portions of the object not yet replicated.

For example, an object could be many gigabytes in size and thus include many thousands of slices. As a pair of source and destination worker nodes process the task to replicate the object, the source worker nodes may send status update messages to the message queue (e.g., 500 slices out of 1,000 slices completed) which the controller then logs into the key-value store. If a restart is necessary, only those slices of the object that have not yet been processed will be processed, while slices already processed are not reprocessed. The replication job can be restarted starting at a particular position that was last logged.

As another example, the controller itself may fail during a replication job. When the controller is restarted or repaired, in a step 1055, the snapshot delta may again be recalculated. That is, the controller may again compare the snapshots to identify the differences and generate tasks. The recalculation of the snapshot delta, however, may be accompanied by a review of the status update messages stored in the key-value store. Based on the review, tasks that have already been completed are not again pushed to the message queue. Tasks that have not yet been completed may again be pushed to the message queue.

In some cases, when a problem that may require restarting occurs, an unfinished task may still be in the message queue or it may be in the middle of being processed by a source worker node but not yet logged. In a specific embodiment, the system waits for all of the worker nodes to complete their current work and then drains the queue. With this technique, new tasks can be accurately determined.

In another specific embodiment, however, the system begins sending tasks immediately to the queue. This technique thus introduces the potential for a duplicate task to be generated. However, even if a duplicate task is generated, a worker node will determine that it is complete (object was already deleted or replicated to the destination) and quickly move to the next task. In other words, the source worker node upon querying the remote destination site to delete an object from the destination site may receive an indication from the destination worker node that the object to delete does not exist at the destination. The source worker node may then determine that the object has already been deleted, send a status update message to the message queue indicating that the deletion task is complete, and proceed to retrieve a next task.

As another example, the source worker node upon querying the remote destination site to replicate an object from the source to destination site may receive an indication from the destination worker node that the object to replicate already exists at the destination site. The source worker node may then determine that the object has already been replicated and there is no need to again replicate the object. The source worker node may then send a status update message to the message queue indicating that the replication task is complete, and proceed to retrieve a next task.

Sending tasks immediately to the queue as compared to waiting for all workers to complete their current work and draining the queue may result in some duplicate tasks being generated and some consumption of network bandwidth as a result of the calls between the worker nodes. However, sending tasks immediately to the queue may involve less code complexity as compared to waiting for the queue to empty. For example, in order to determine that the queue is empty, the controller may need to periodically query the queue to check whether the queue is empty. Instead or additionally, the controller may need to communicate with the worker nodes and instruct the worker nodes to inform the controller of completion—before generating new tasks. Some users or customers may prefer that tasks be sent immediately. Others, however, may prefer the latter. In a specific embodiment, the microservice system is flexible and can be configured accordingly to suit the preferences of different users or customers.

In a specific embodiment, the key-value store is located on a persistent storage device or other media. Logging the status update messages into the key-value store for persistent storage helps the controller to determine a status of a replication job if the replication job should unexpectedly terminate or fail. For example, the message queue may be in a volatile or non-persistent location (e.g., memory). If there is a failure such as power being lost during a replication job, host errors, and so forth, the update messages on the message queue may be lost. Nonetheless, the status of the replication job can still be determined when the system is brought back online by examining the key-value store. Tasks, objects, or portions of objects that have already been processed do not have to be reprocessed.

As discussed above, in another specific embodiment, an ongoing log of changes made to source object storage is maintained. Such changes may include, for example, a creating of an object, a writing to an object, a deletion of an object, and so forth. In this specific embodiment, when a replication job or event is initiated, the log may be marked as each entry in the log is replicated to destination object storage. If a need arises to restart the replication, the log can be examined to determine which entries have been marked as processed and which entries have not been marked as processed. Thus, entries (e.g., writes) already processed do not have to be reprocessed and entries not yet processed may be processed once the replication is restarted.

Figure 11:
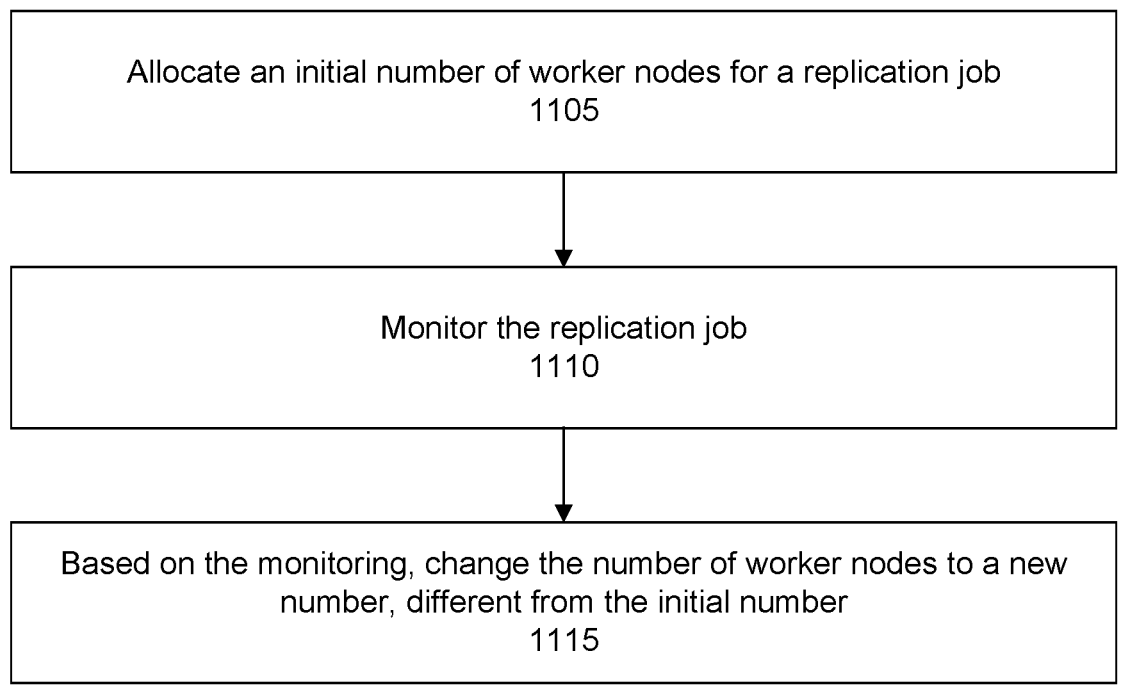
FIG. 11 shows a flowchart for dynamically allocating worker nodes in accordance with one or more embodiments.

FIG. 11 shows a flow for dynamically allocating and deallocating worker nodes. In between replication periods, the controller, worker nodes, or both may be turned off or deactivated to save computation costs at the source site, destination site, or both. In a specific embodiment, additional worker nodes can be allocated based on various metrics such as a preconfigured number, based on CPU, I/O, memory, or network limitations per node, based on number of outstanding tasks in the message queue, other metrics or combinations of these.

In a specific embodiment, a controller determines the number and complexity of tasks and allocates worker nodes at a beginning of a replication job. Higher priority replication tasks may be assigned more worker nodes than lower priority replication tasks so that the higher priority tasks complete faster than the lower priority tasks. As tasks are completed and the load decreases, workers can be deallocated. The customer or administrator may place constraints on the number of nodes to control costs. A budget may be set and as the costs of nodes vary over time, appropriate nodes are allocated to fit within the budget (e.g., spot instances may be temporarily very cheap).

More particularly, in a step 1105, an initial number of worker nodes including source worker nodes and destination worker nodes are allocated for a replication job. In a specific embodiment, the number of worker nodes to allocate including source worker nodes, destination worker nodes, or both is calculated dynamically. The number of worker nodes to allocate may be based on a number of replication tasks that have been placed onto the message queue, a size of the data set to be replicated, compute resources of a node, available network bandwidth, complexity of tasks to be processed, priority level of the replication, time constraints, cost constraints, or combinations of these. The number of worker nodes to allocate may be proportional to factors such as the number of the tasks, size of the data set to be replicated, priority level, and so forth.

There can be a user-configurable threshold value specifying a number of tasks a pair of source and destination worker nodes are expected to process. The number of pairs of source and destination worker nodes to allocate may be calculated by counting the total number of tasks placed on the message queue and dividing the total number of tasks by the threshold value. As an example, consider that each pair of source and destination worker nodes are expected to process 5 tasks and that the total number of tasks generated and placed on the message queue is 100. In this example, the number of pairs of source and destination worker nodes to allocate is 20 (e.g., 100 total tasks/5 tasks per pair of worker nodes=20 pairs of worker nodes), i.e., 20 source worker nodes and 20 destination worker nodes.

There can be a user-configurable threshold value specifying a replication data size a pair of source and destination worker nodes are expected to process. The number of pairs of source and destination worker nodes to allocate may be calculated by determining the total amount of data to be replicated and dividing the total amount by the threshold value. As an example, consider that each pair of source and destination workers nodes are expected to process 1 gigabyte (GB) and that the total amount of data to replicate is 0.5 terabyte (TB). In this example, the number of pairs of source and destination worker nodes to allocate is 500 (e.g., 0.5 TB/1 GB per pair of worker nodes=500 pairs of worker nodes).

The threshold values may be specified as a range of threshold values corresponding to, for example, a number of tasks to process or a size of a data set to replicate. For example, a first number of worker nodes may be allocated when a number of tasks to process falls within a first threshold range having a first lower limit and a first upper limit. A second number of worker nodes, different from the first number of worker nodes, may be allocated when the number of tasks to process falls within a second threshold range, different from the first threshold range, and having a second lower limit and a second upper limit.

As another example, different types of tasks may be assigned different levels of complexity. Greater numbers of complex tasks to process may result in more worker nodes being allocated as compared to when there are fewer numbers of less complex tasks. For example, tasks to replicate objects may be assigned a higher level of complexity as compared to tasks to delete objects as replicating an object may involve multiple calls between source and destination worker nodes, dividing the object into segments, grouping segments, calculating and comparing fingerprints, copying data from the source to destination site, and so forth. A number of worker nodes to allocate may be a function of the number of tasks to process, the number of complex tasks to process, the number of less complex tasks to process, other factors, or combinations of these.

As another example, a user may specify a constraint that a replication job be completed within a particular period of time. An attribute may be stored indicating a data transfer rate per worker node or pair of worker nodes. The controller, upon examining the snapshot delta to determine the amount of data to be copied can then calculate the number of worker nodes to allocate based on the specified time constraint and data transfer rate. In other words, the controller assess, examines, estimates, or analyzes the amount of work to be done, reviews the time allowed for replication, and allocates a particular number of worker nodes accordingly.

In a specific embodiment, a method may include assigning a first level of complexity to a first type of task, assigning a second level of complexity to a second type of task, counting a number of tasks of the first type, and counting a number of tasks of the second type. If the number of tasks of the first type exceeds a first threshold, a first number of worker nodes may be allocated. If the number of tasks of the second type exceeds a second threshold, a second number of worker nodes may be allocated, different from the first number of worker nodes.

In a step 1110, the replication job is monitored. In a step 1115, based on the monitoring, the number of worker nodes allocated may be changed dynamically during the replication job to a new number, different from the initial number.

In a specific embodiment, the generation of tasks and placement of the tasks onto the message queue for processing by the worker nodes occurs in parallel or concurrently. That is, as tasks are being generated and placed onto the message queue, the source worker nodes may be retrieving the tasks from the message queue. The monitoring may include tracking a current count or number of tasks remaining on the message queue for processing. When the current count exceeds a threshold, one or more additional worker nodes may be allocated. When the current count falls below a threshold, one or more existing worker nodes may be deallocated.

Monitoring may include tracking an amount of time elapsed and amount of data transferred since a replication job was started; estimating a time to complete the replication job based on the amount of time elapsed, amount of data transferred, and remaining amount of data to be transferred; comparing the estimated time to complete with a constraint indicating an amount of time allotted for the replication; and based on the comparison, allocating additional worker nodes or deallocating existing worker nodes. For example, if the calculation and comparison indicates that the replication job will be completed ahead of the amount of time allowed, one or more existing worker nodes may be deallocated to save costs. Alternatively, if the calculation and comparison indicates that the replication job will be completed late, additional worker nodes may be allocated.

In a specific embodiment, monitoring includes obtaining a metric; comparing the metric to a threshold; and scaling the number of worker nodes based on the comparison. In a specific embodiment, the metric includes CPU utilization. For example, if the CPU utilization is above the threshold, new worker nodes may be allocated. If the CPU utilization is below the threshold, existing worker nodes may be deallocated. A metric may instead or additionally include memory-related metrics, network metrics, time-based metrics, connection metrics, or any other metric or combination of metrics that may indicate the availability of resources or health of a worker node.

Figure 12:
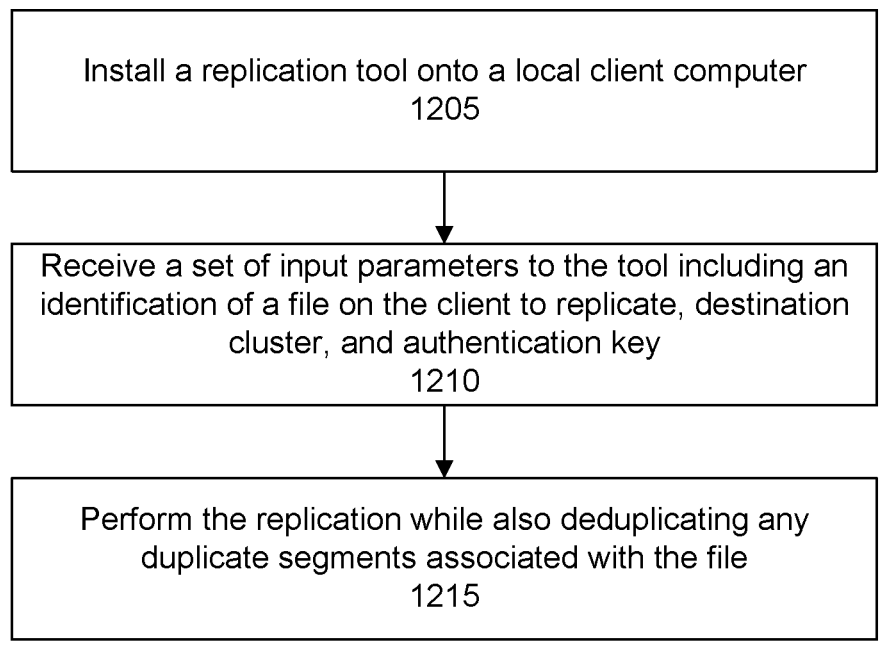
FIG. 12 shows a flowchart of a local client replication tool in accordance with one or more embodiments.

FIG. 12 shows a flow for replicating from a non-cloud source (e.g., non-clustered environment) to a destination cloud site. In a step 1205, a replication tool is installed onto a local client computer. In a step 1210, a set of input parameters are received at the tool including an identification of a file or object on the client to replicate, destination cluster, and authentication key. In a step 1215, the replication from the client to the destination cluster or site is performed while also deduplicating any duplicate segments associated with the file.

The tool allows for efficiently transferring a local file or object from a standard computer to a micro-service instance. The tool communicates over the same RPCs as the replication protocol described herein. That is, the tool splits the local object into slices, generates segment references (if they do not already exist), and performs the replication protocol for a single object. Specifically, as discussed, the object or file may be divided or split into segments of approximately 8 KB and formed or grouped into slices of approximately 8 MBs. This tool can be run on desktops, laptops, servers, phones, etc. to efficiently transfer objects to cloud storage.

In a specific embodiment, the tool may not include the options available to the cluster-based replication microservice because the tool is designed to be lightweight. Thus, the tool may not include the replication scheduling options, snapshotting, snapshot delta calculations, and so forth. Nonetheless, the tool can allow, for example, the user to write a very large local file or other object into the service. In an embodiment, the tool is designed to be run on-demand where the user selects a single file or object to write into the service. Depending upon the capabilities of the local client computer, however, the user may run the tool multiple times in parallel to write multiple objects into the service.

Figure 13:
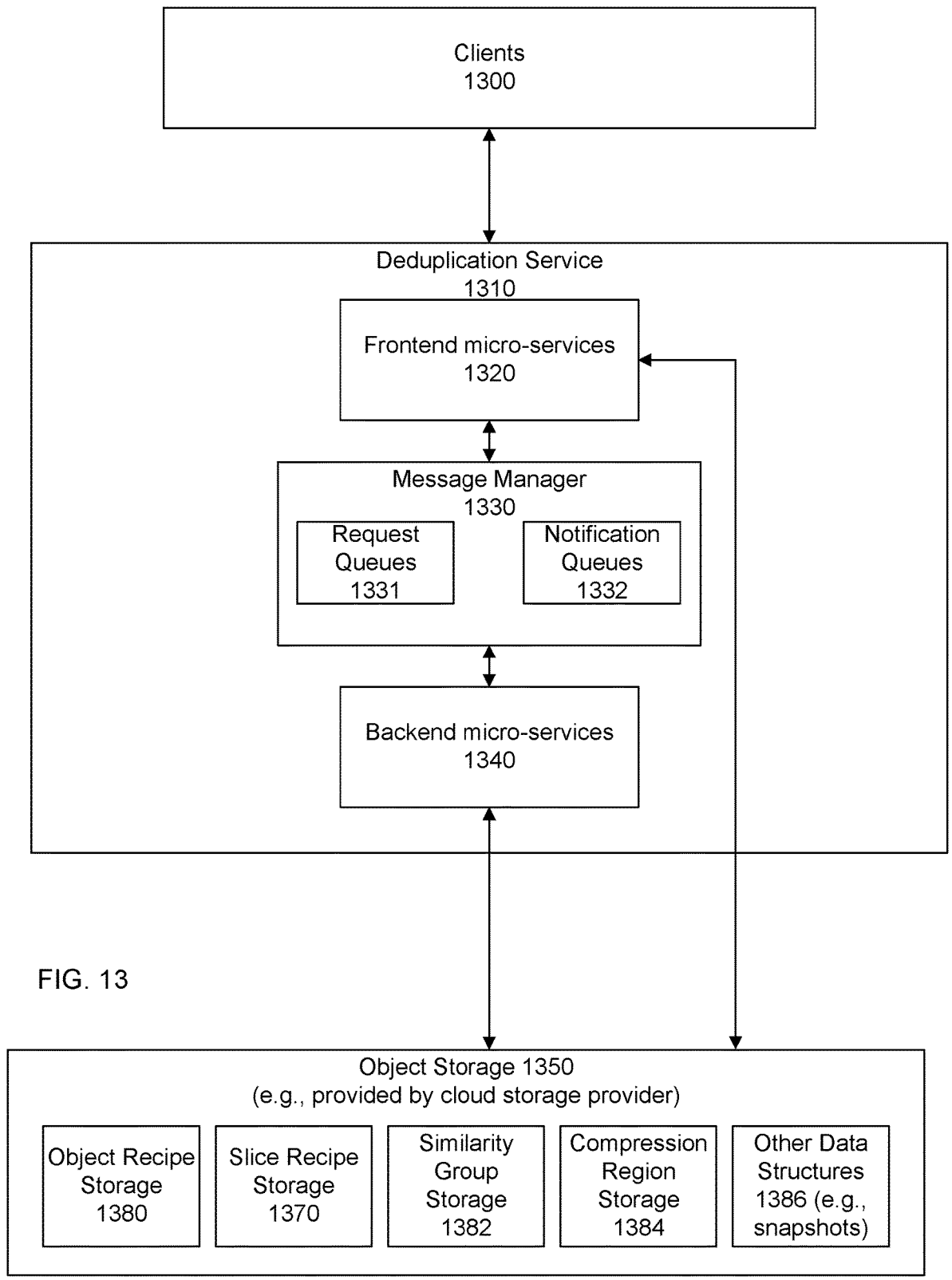
FIG. 13 shows a diagram of a system in accordance with one or more embodiments.

FIG. 13 shows a block diagram of a deduplication service. In a specific embodiment, methods and systems may provide functionality for deduplicating data before storing the data in the object storage. Deduplicating the data, before storing the data in the object storage, may increase the amount of data that can be stored in the object storage when compared to the amount of data that can be stored in the object storage without deduplicating the data. Deduplicating the data may also decrease the cost associated with storing data in the object storage by reducing the total amount of storage required to store the deduplicated data when compared to the amount of storage required to store the data without being deduplicated.

As used herein, deduplication refers to methods of storing only portions of data that are not already stored in the storage. For example, when multiple versions of a large text document, having only minimal differences between each of the versions, are stored without deduplication, storing each version will require approximately the same amount of storage space of a persistent storage. In contrast, when the multiple versions of the large text document are stored with deduplication, only the first version of the multiple versions stored will require a substantial amount of storage. Once the first version is stored in a persistent storage, the versions of the large word document subsequently stored will be deduplicated before being stored in the persistent storage resulting in much less storage space of the persistent storage being required to store the subsequently stored versions when compared to the amount of storage space of the persistent storage required to store the first stored version. In one or more embodiments, the method of deduplication may include receiving data and dividing the data into slices by one or more frontend micro-services. The slices may be deduplicated by one or more backend micro-services by matching each slice to a similarity group. The meta-data associated with the matched similarity group may specify fingerprints of a subset of segments of all the segments stored in the object storage. For each slice, a fingerprint of each segment of the slice may be matched to the fingerprints of the subset of the segments. Any fingerprints that are not matched to any of the fingerprints of the subset of the segments may cause the corresponding segments to be added to one or more compression regions. Fingerprints, corresponding to each fingerprint that was not match, maybe added to the meta-data of the similarity group. The one or more compression regions may be stored in the object storage. Slice recipes and an object recipe that allow for each slice of the data and the data, respectively, to be reconstructed from the data stored in the object storage may be stored for future use. In one or more embodiments, the number of frontend micro-services and/or the number of backend micro-services may be dynamically adjustable. Adjusting the number of each micro-service may enable computing resources to be efficiently allocated to different portions of the method of deduplication. More efficiently allocating the computing resources used to store data in the storage may improve the data storage throughput rate of the storage, eliminating bottlenecks of the storage, decrease the cost of storage by dynamically deallocating reserved computing resources in response to changes in rates of storage, and/or provide a scalable data storage system.

FIG. 13 shows a system in accordance with one or more embodiments. The system may include clients 1300 that store data in a persistent object storage 1350. The system may include a deduplication service 1310 that deduplicates the data from the clients 1300 before the data is stored in the object storage 1350. In one or more embodiments of the invention, the clients 1300 and/or the object storage 1350 are not part of the system. Object storage 1350 may include object recipe storage 1380, slice recipe storage 1370, similarity group storage 1382, compression region storage 1384, and other data structures or storage 1386. The clients and object storage may be as shown in FIG. 1B and described above. For additional details regarding the object storage 1350, the slice recipe storage 1370, and the object recipe storage 1380, see FIGS. 14A-14D.

The object storage 1350 may be operably connected to the deduplication service 1310. While not shown in FIG. 13, the persistent storage may be operably connected to the clients 1300 or other elements of the system without departing from the invention.

The deduplication service 1310 may receive data from the clients 1300 and deduplicate the data before storing the data in the object storage 1350. The deduplication service 1310 may also provide data, stored in the object storage, in response to requests for the data from the clients 1300. In one or more embodiments, the deduplication service 1310 may be a service executing on a cloud platform, e.g., a platform as a service.

As used herein, a cloud platform is a logical computing resource that abstracts the aggregated physical resources of one or more physical computing systems. One or more of the physical computing systems may be a physical device that includes non-transitory storage, memory (e.g. Random Access Memory), and one or more processors. The non-transitory storage may include instructions which, when executed by the one or more processors, enable the cloud platform to perform the functions described in this application and shown in FIGS. 16-20.

In one or more embodiments, the deduplication service 1310 may be a physical device that includes non-transitory storage, memory (e.g., Random Access Memory), and one or more processors. The physical device may be, for example, a server. The physical device may be other types of computing devices without departing from the invention. The non-transitory storage may include instructions which, when executed by the one or more processors, enable the physical device to perform the functions described in this application and shown in FIGS. 16-20.

The deduplication service 1310 may include frontend micro-services 1320 that receive data from clients 1300, backend micro-services 1340 that deduplicate slices of the received data, and a message manager 1330 that manages requests and notifications between the frontend micro-services 1320 and the backend micro-services 1340. The frontend micro-services 1320 and backend micro-services 1340 may also facilitate providing data stored in the object storage to the clients 1300. Each component of the deduplication service 1310 is described below.

The frontend micro-services 1320 may be one or more services that receive data sent by the clients 1300 for storage in the object storage 1350, prepare the data for deduplication, and forward the prepared data to the backend micro-services 1340. In response to obtaining a data storage request sent by a client, a frontend micro-service may perform the method shown in FIG. 16. In one or more embodiments of the invention, the frontend micro-services 1320 may be micro-services executing on a cloud platform.

The frontend micro-services 1320 may also obtain requests for data stored in the object storage 1350. The frontend micro-services may perform the method shown in FIG. 18 to facilitate reading of data from the object storage 1350.

While not illustrated in FIG. 13, the system may include a load balancer that receives all, or a portion thereof, of the requests to store and/or obtain data in the object storage from the clients 1300 and distributes the requests to the frontend micro-services. The number of frontend micro-services may be dynamically adjusted, i.e., additional instances of the frontend micro-services may be instantiated or existing instances of the frontend micro-service may be terminated, to match the request processing capacity of the frontend micro-services 1320 to the rate of requests for storing data in the object storage from the clients 1300. For example, the number of requests from the clients may exceed the request processing capacity of the frontend micro-services 1320 resulting in the development of a backlog of requests and thereby result in a mismatch. In another example, the number of requests from the clients may be exceeded by the request processing capacity of the frontend micro-services 1320 resulting in idle frontend micro-services and thereby result in a mismatch.

The message manager 1330 may facilitate transmission of requests and notifications between the frontend micro-services 1320 and the backend micro-services 1340. In one or more embodiments of the invention, the message manager 1330 may be a service executing on a cloud platform. The message manager 1330 may include request queues 1331 and notification queues 1332. Each of the queues is discussed below.

The request queues 1331 may be one or more queues that queue slices of data generated by the frontend micro-services 1320 for processing by the backend micro-services 1340 or queue slices of data reconstructed by the backend micro-services 1340 for use by the frontend micro-services 1320 when reconstructing stored data. Each of the queues of the request queues 1331 may be first in first out queues. The queues of the request queues 1331 may be other types of queues without departing from the invention. For example, the queues may be configured to prioritize certain slices for processing by the backend micro-services 1340 over other slices, e.g., certain slices may be moved to the front of the queue based on a type, quality, or meta-data associated with the slices.

In one or more embodiments, a first queue may be assigned to facilitate storing of data in the object storage and a second queue may be assigned to facilitate reading of data from the object storage. For example, the first queue may send slices of data to the backend micro-services for processing when data is being stored in the object storage and the second queue may send reconstructed slices of data to the frontend micro-services for processing when data is being read from the object storage. The second queue may be a notification queue that enables a backend micro-service to send a reconstructed slice to a specified frontend micro-service. The first queue may be a request queue that enables a frontend micro-service to send a slice request or a slice to any backend micro-service without specifying the specific micro-service that will receive the request. In other words, the first queue may send requests to any backend microservice while the notification queue may send reconstructed slices to frontend micro-services that requested the slice that has been reconstructed.

The notification queues 1332 may be messaging queues that enable the backend micro-services 1340 and the frontend micro-services 1320 to exchange confirmation of completion messages of any portion of the methods shown in FIGS. 16-19.

The backend micro-services 1340 may be one or more micro-services that receive slices of data from the message manager 1330 for storage in the object storage 1350, deduplicate the slice, and store the deduplicated slice in a compression region 1384 in the object storage 1350. The backend micro-services may perform the method shown in FIG. 17 to facilitate storing of deduplicated data in the object storage. In one or more embodiments of the invention, the backend micro-services 1340 may be micro-services executing on a cloud platform.

The backend micro-services 1340 may also obtain requests for slices of data stored in the object storage 1350. The backend micro-services may perform the method shown in FIG. 19 to facilitate providing slices of data stored in the object storage.

In one or more embodiments, the number of backend micro-services may be dynamically adjusted, i.e., additional instances of the backend micro-services may be instantiated or existing instances of the backend micro-service may be terminated, to match the slice processing capacity of the backend micro-services 1340 to the rate of requests for storing slices of data and/or retrieving slices of data in the object storage from the clients 1300. The number of backend micro-services may be dynamically adjusted by performing the method shown in FIG. 20.

In one or more embodiments, the backend micro-services and/or frontend micro-services may be adjusted based on a processing load and/or memory usage load of the hardware on which the deduplication service is executing.

The frontend micro-services and backend micro-services may utilize a number of storages to provide the functionality described herein. FIGS. 14A-14D shows diagrams of structures of the storages (1350, 1370, 1380, FIG. 13) that may be utilized by the frontend and/or backend micro-services.

Additionally, while the frontend micro-services and backend micro-services have been described as separate services, embodiments are not limited to separate services performing the functionality of the frontend and backend micro-services respectively. The functionality of the frontend and backend micro-services may be performed by a single service without departing from the invention. For example, a single service may perform the functionality, described herein, of both the frontend and backend micro-services.

Figure 14A:
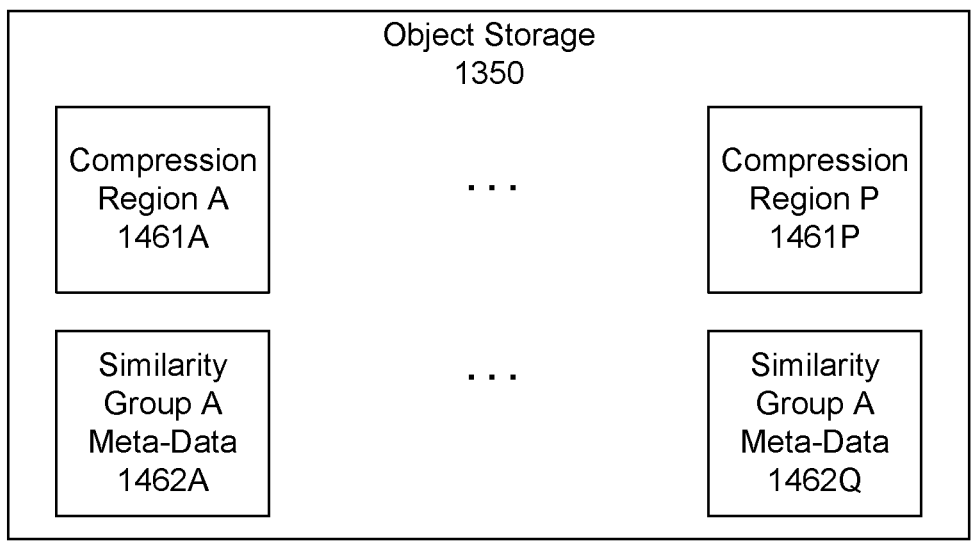
FIG. 14A shows a diagram of an object storage in accordance with one or more embodiments.

FIG. 14A shows an object storage 1350 in accordance with one or more embodiments. The object storage 1350 may store compression regions 1461A, 1461P and similarity group meta-data 1462A-1462Q.

Each of the compression regions 1461A, 1461P may store one or more segments of one or more slices of data. As used herein, a compression region is one or more pieces of data that are aggregated and/or compressed.

Each of the similarity group meta-data 1462A-1462Q may specify meta-data associated with a similarity group. The meta-data of each similarity group may specify a sketch and a number of fingerprints. The sketch may be used to match slices of data to the similarity group. The fingerprints may be used to determine whether a segment of a slice of data that mapped to a similarity group is already present in the object storage.

Figure 14B:
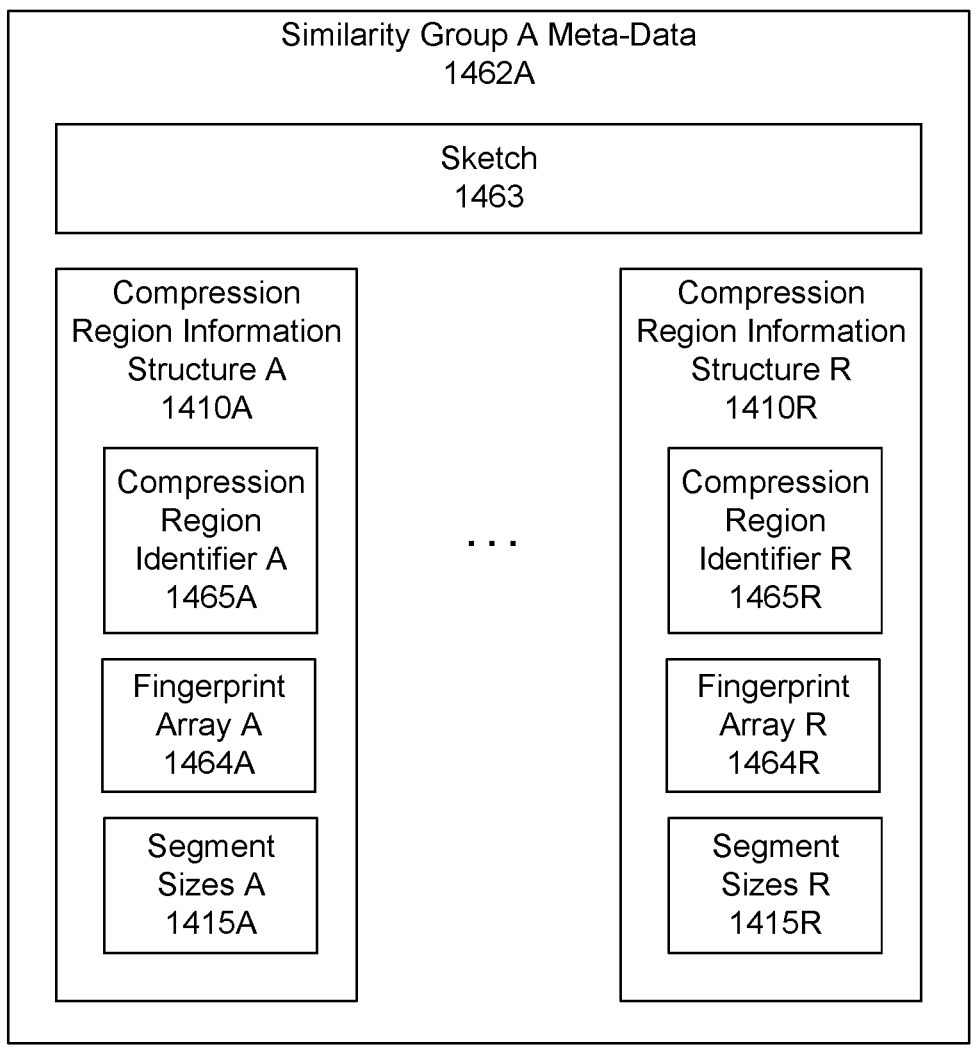
FIG. 14B shows a diagram of a similarity group meta-data entry in accordance with one or more embodiments.

FIG. 14B shows an example of a similarity group A meta-data 1462A. The similarity group A meta-data 1462A includes a sketch 1463 and an array of compression region information structures 1410A-1410R. Each compression region information structure 1410A-1410R includes a compression region identifier 1465A-1465R (e.g., name of the compression region in object storage), an array of fingerprints 1464A-1464R, and segment sizes 1415A-1415R corresponding to the segments in the compression region.

In one or more embodiments, a sketch may be a bit sequence that does not uniquely identify a slice. Rather, the sketch may be a bit sequence that identifies a group of slices that each include similar but unique data or include identical data. In other words, the sketch of multiple, different slices may be the same bit sequence if each slice includes similar but unique data or includes identical data.

In one or more embodiments, a fingerprint may be a bit sequence that virtually uniquely identifies a segment of a slice. As used herein, virtually uniquely means that the probability of collision between the fingerprints of two segments that specify different data is negligible, compared to the probability of other unavoidable causes of fatal errors. In one or more embodiments, the probability is $10^{-20}$ or less. In one or more embodiments, the unavoidable fatal error may be caused by a force of nature such as, for example, a tornado. In other words, the fingerprint of any two segments that specify different data will virtually always be different.

While the similarity group meta-data has been illustrated as only including a sketch 1463 and compression region information structures 1410A-1410R having compression region identifiers 1465A-1465R, fingerprints 1464A-1464R, and segment sizes 1415A-1415R, the similarity group meta-data may include other data without departing from the invention. For example, the similarity group may specify a length of a compression region, an offset from the start of a compression region, a bit sequence, a name, or other types of data without departing from the invention.

Returning to FIG. 14A, while the object storage 1350 has been illustrated as only including compression regions and similarity group meta-data, other types of data may also be stored in the object storage 1350 without departing from the invention. For example, the object storage 1350 may include the slice recipe storage 1370, the object recipe storage 1380, meta-data associated with each compression region, or other types of data. The meta-data associated with each compression region may specify segment boundaries between multiple segments that are stored in each compression region, keys to portions of the compression region, or other data that may identify or specify portions of a compression region.

Figure 14C:
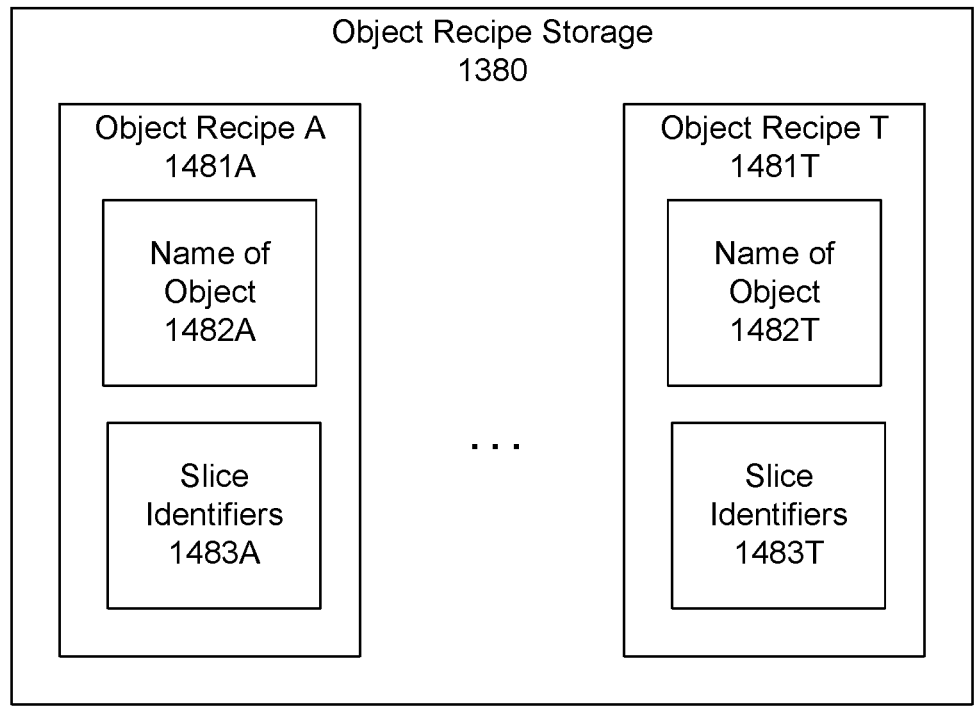
FIG. 14C shows a diagram of an object recipe storage in accordance with one or more embodiments.

FIG. 14C shows an object recipe storage 1380 in accordance with one or more embodiments. The object recipe storage 1380 may include a number of object recipes 1481A-1481T that include data that may be used to reconstruct a data object. The data object may be, for example, a data file or a portion of a data file that has been previously stored in the object storage 1350 (FIG. 14A). Each object recipe 1481A-1481T may include a name of an object 1482A-1482T and slice identifiers 1483A-1483T. Object recipes may be generated as part of the method of storing the data in the object storage shown in FIG. 16.

The name of an object 1482A-1482T of each object recipe 1481A-1481T may be a name of a data object stored in the object storage. The name of the object 1482A-1482T may be used to identify the object recipe 1481A-1481T when an entity requests to read a data stored in the object storage by the method of reading data shown in FIG. 18.

The slice identifiers 1483A-1483T may specify one or more slice recipes 1471A-1471U stored in the slice recipe storage 1370. The slice recipe identifiers 1483A-1483T may be passed to the backend micro-services by the method of reading data shown in FIG. 18 to obtain each of the slices of data corresponding to each of the slice recipes. The slice identifiers 1483A-1483U may be, for example, one or more keys, bit sequences, or other data that enables the backend micro-services to obtain a corresponding slice recipe. In a specific embodiment, the object recipe records the number of slice recipes needed to reconstruct the object and not all of the names. Slice recipe names can be reconstructed based on the object recipe name and the number of slices. This reduces the size of the object recipe versus keeping the full name of the slice recipes.

While the object recipes 1481A-1481T have been illustrated as only including a name of an object 1482A-1482T and slice identifiers 1483A-1483T, the object recipes 1481A-1481T may include other data without departing from the invention. In a specific embodiment, the object recipe includes the object size and a checksum or hash over the user-written object or metadata derived from the user-written data. This is used in the replication of an object to check whether an object was already transferred and is correctly stored.

Figure 14D:
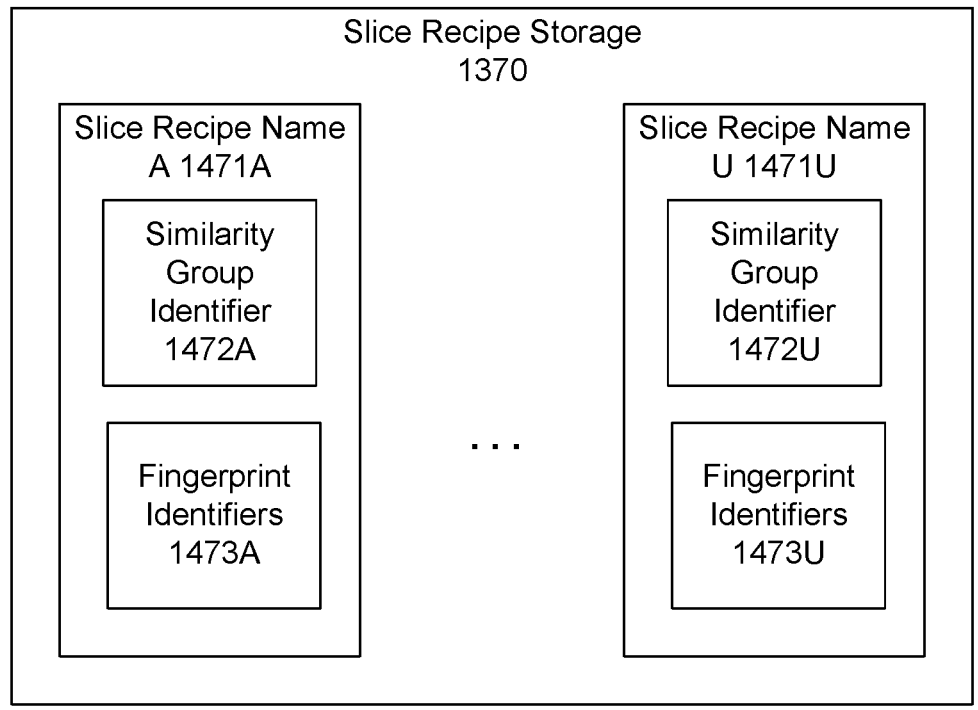
FIG. 14D shows a diagram of a slice recipe storage in accordance with one or more embodiments.

FIG. 14D shows a slice recipe storage 1370 in accordance with one or more embodiments. The slice recipe storage 1370 may include a number of slice recipes 1471A-1471U that include data that may be used to reconstruct a slice of data. Each slice recipe 1471A-1471U may include a similarity group identifier 1472A-1472U and fingerprint identifiers 1473A-1473U.

The slice recipe may have a name, i.e., slice recipe name A that uniquely identifies the slice of data. Slice recipes may be generated as part of the method of storing the data in the object storage shown in FIG. 17. The similarity group identifier 1472A-1472U may specify a similarity group and the corresponding meta-data 1462A-1462Q (FIG. 14A) of the similarity group.

The similarity group identifier 1472A-1472U may be, for example, a key, bit sequence, or other data that enables the corresponding meta-data to be obtained. The fingerprint identifiers 1473A-1473U may specify one or more fingerprints 1464A-1464R of the similarity group meta-data that corresponds to the similarity group specified by the similarity group identifier 1472A-1472U.

The fingerprint identifiers 1473A-1473U may be, for example, one or more keys, bit sequences, or other data that enables the one or more fingerprints 1464A-1464R (FIG. 14B) of the similarity group meta-data to be obtained. Obtaining the one or more fingerprints 1464A-1464R (FIG. 14B) may enable segments of the slice stored in compression regions specified by the compression region identifier 1465A-1465R, FIG. 14B to be obtained.

While the slice recipes 1471A-1471U have been illustrated as only including a similarity group identifier 1472A-1472U and fingerprint identifiers 1473A-1473U, the slice recipes 1471A-1471U may include other data without departing from the invention.

Figure 15A:
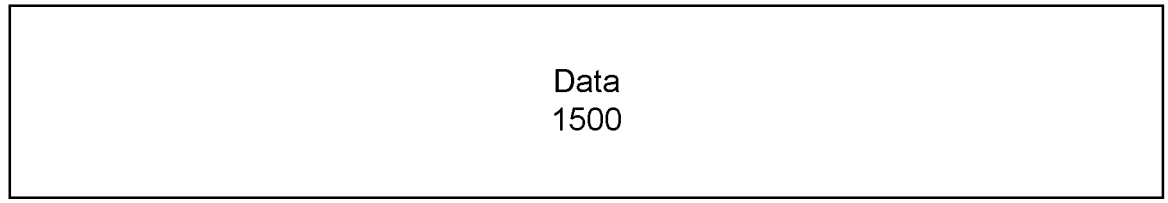
FIG. 15A shows a diagram of data in accordance with one or more embodiments.
Figure 15B:
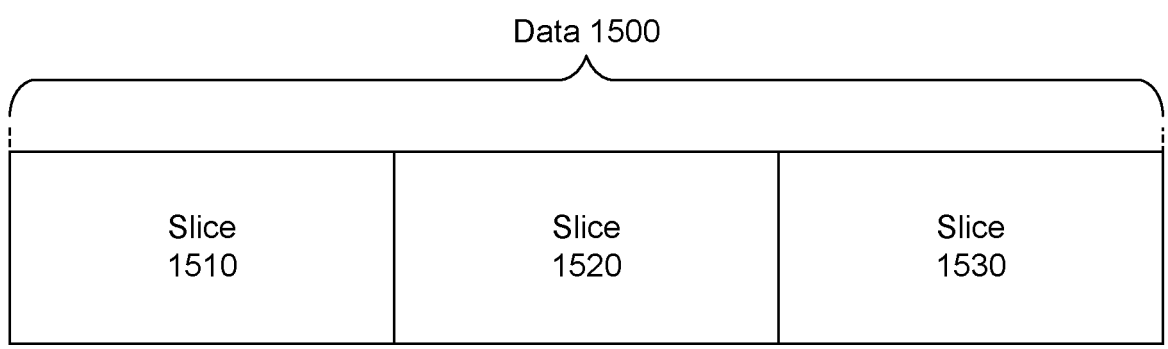
FIG. 15B shows a diagram of slices of the data of FIG. 15A in accordance with one or more embodiments.

FIGS. 15A-15B show diagrams that illustrate relationships between data 1500, slices 1510, 1520, 1530 of the data 1500, and segments 1511, 1512, 1513 of a slice 1510 of the data 1500, respectively. The data 1500 may divided into segments and slices as part of the method shown in FIG. 16.

FIG. 15A shows a diagram of data 1500 in accordance with one or more embodiments. The data may be any type of data in any format and of any length.

FIG. 15B shows a diagram of slices 1510, 1520, 1530 of the data 1500. Each slice of the data may include separate, distinct portions of the data 1500. Each of the slices may be of different, but similar lengths. For example, each slice may include approximately 8 megabytes of data, e.g., a first slice may include 8.05 megabytes of data, the second slice may include 7.93 megabytes of data, etc. In one or more embodiments, the average amount of data of each slice is between 4 and 16 megabytes.

Figure 15C:
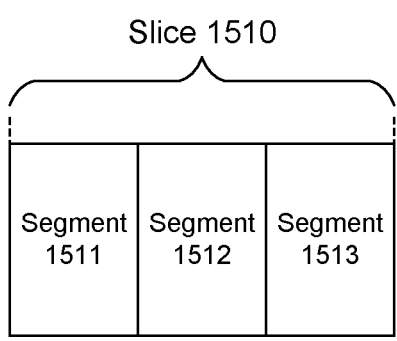
FIG. 15C shows a diagram of segments of a slice of FIG. 15B in accordance with one or more embodiments.

FIG. 15C shows a diagram of segments 1511, 1512, 1513 of a slice 1510 of the data 1500. Each segment may include separate, distinct portions of the slice 1510. Each of the segments may be of different, but similar lengths. For example, each segments may include approximately 8 kilobytes of data, e.g., a first segment may include 8.03 kilobytes of data, the second segment may include 7.96 kilobytes of data, etc. In one or more embodiments, the average amount of data of each segment is between 4 and 16 kilobytes.

FIGS. 16-20 show flowcharts in accordance with one or more embodiments of the technology. The methods shown in FIGS. 16 and 17 may facilitate storing data in the object storage while the methods shown in FIGS. 18 and 19 may facilitate reading stored data from the object storage. The method shown in FIG. 20 may facilitate both reading and storing of data in the object storage by adjusting computing resources dedicated to the reading and/or writing of data to the object storage. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

Figure 16:
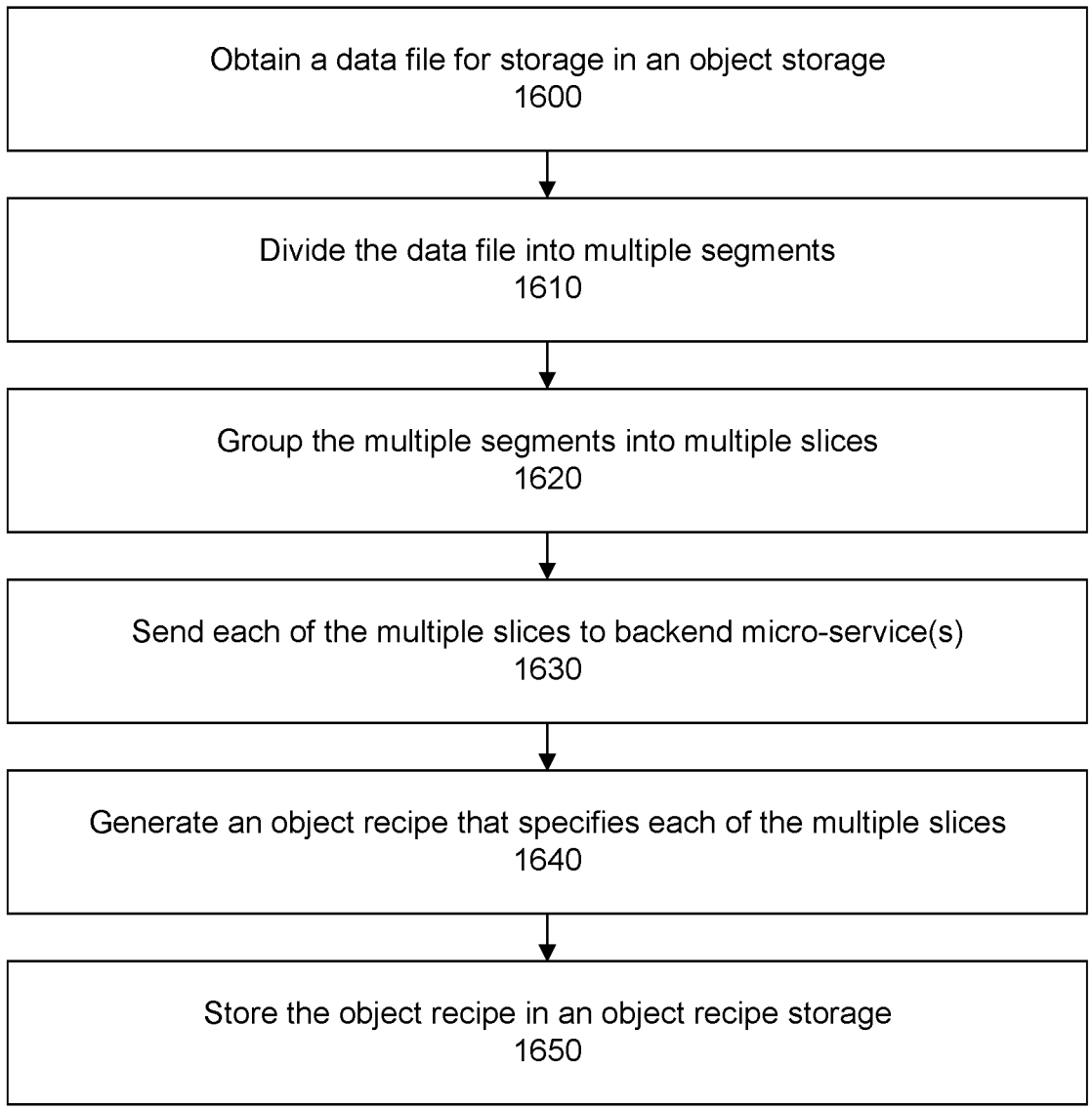
FIG. 16 shows a flowchart of a method of storing data in an object storage in accordance with one or more embodiments.

FIG. 16 shows a flowchart according to one or more embodiments. The method depicted in FIG. 16 may be used to store data in an object storage in accordance with one or more embodiments of the invention. The method shown in FIG. 16 may be performed by, for example, a frontend micro-service of the deduplication service 1310 (FIG. 13).

In step 1600, a deduplication service may obtain a data file, or a portion thereof, for storage in an object storage. The data file may be provided to the deduplication service by a client operably connected to the deduplication service.

In one or more embodiments, the data file may be received by a load balancer of the deduplication service. The load balancer may added the data file to a queue of data files to be stored in the object storage. The load balancer may provide the data file to a frontend micro-service of the deduplication service once the data file reaches the head of the queue.

In one or more embodiments, the data file may be streamed to the deduplication service. In other words, portions of the data file or a data stream may be sent to the deduplication service overtime. The load balancer may assign a frontend micro-service of the deduplication service to receive the streamed data file or data stream and perform one or more of the other steps of the process shown in FIG. 16 on portions of the streamed data as it is streamed.

In step 1610, the frontend micro-service may divide the data file into multiple segments. The segments may be non-overlapping portions of the data file each having approximately the same length as described with respect to FIG. 15C.

In one or more embodiments, the data file may be divided into segments by generating a rolling hash of the data file. A rolling hash may be successive hashes of a window as the window moves through the data file. For example, a first hash of the rolling has may be a hash of 64 bytes of data starting at the first byte of the data file, a second hash of the rolling has may be a hash of 64 bytes of data starting at the second byte of the data file, a third hash of the rolling has may be a hash of a 64 bytes of data starting at the third byte of the data file, etc.

A number of segment breakpoints may then be selected by comparing each hash, or a portion thereof, of the rolling hash to a predetermined bit sequence. The starting byte of each hash that matches the predetermined bit pattern may be selected as a segment breakpoint. The location of each selected starting byte may be used as the segment breakpoints. In one or more embodiments, the predetermined bit sequence may consist of 13 bits.

The segments of the data file may be generated by dividing the data file into portions based on the locations specified by the segment breakpoints. For example, a first segment may begin at the start of the data file and end at the location specified by the first segment break point, a second segment may begin at the location specified by the first segment break point and end at the location specified by the second segment breakpoint, a third segment may begin at the location specified by the second segment break point and end at the location specified by the third segment breakpoint, etc.

In step 1620, the frontend micro-service may group multiple segments into multiple slices. The slices may be non-overlapping portions of the data file each having approximately the same length as described with respect to FIG. 15B.

In one or more embodiments, the segments may be grouped into slices using the rolling hash of step 1610.

A number of slice breakpoints may be selected by comparing each hash, or a portion thereof, of the rolling hash to a second predetermined bit sequence. The starting byte of each hash that matches the second predetermined bit pattern may be selected as a slice breakpoint. The location of each selected starting byte may be used as the slice breakpoints. In one or more embodiments of the invention, the second predetermined bit sequence may consist of 23 bits.

The slices of the data file may be generated by aggregating the segments based on the locations specified by the slice breakpoints. For example, a first slice may be generated by aggregating the segments that have locations between the start of the data file and the location specified by the first slice break point, a second slice may be generated by aggregating the segments between the location of the first slice break point and the location of the second slice break point, a third slice may be generated by aggregating all of the segments between the location of the second slice break point and the location of the third slice breakpoint, etc.

In step 1630, the frontend micro-service may send each of the slices to one or more backend micro-services.

In one or more embodiments, the frontend micro-service may send each of the slices by loading the slices into a request queue that queues each of the slices and/or load balances each of the slices across the one or more backend micro-services.

For example, each of the slices may be sequentially loaded into a request queue. The request queue may then provide a slice to a backend micro-service when the micro-service indicates that it is available for processing. The request queue may then provide a second slice to a second backend micro-service when the second micro-service indicates that it is available for processing. The process may be repeated until all of the slices have been provided to backend micro-services. The request queue may send multiple of the slices to the same backend micro-service without departing from the invention.

In one or more embodiments, the frontend micro-service may wait to receive a notification from one or more backend micro-services that indicates that each slice has been successfully stored before performing steps 1640 and/or 1650.

In step 1640, the frontend micro-service may generate an object recipe. The object recipe may specify the data shown in, for example, the object recipe A 1481A of FIG. 14C. The recipe may include the name of the object, i.e., the name of the data file that a client will use to reference the data file, and one or more slice identifiers, i.e., data used to identify the slices that make up the data file.

The name of the object may be generated based on a name of the data file provided by the client. In one or more embodiments, the clients and the frontend micro-services may implement a predetermined naming convention for data files that are stored in the object storage.

Each of the slice identifiers may be generated based on a predetermined naming convention between the frontend micro-services and the backend micro-services. For example, the first slice of a data file may be the name of the data file with a slice number, reflecting the relative location of the slice within the data file, appended to the name of the data file.

The slice identifiers may be generated using other methods without departing from the invention. For example, a slice may be given an arbitrary identifier by a frontend micro-service and the slice identifier may be sent to the backend micro-services along with the slice to ensure consistent naming and identification of slices between the frontend micro-services and the backend micro-services.

In step 1650, the frontend micro-service stores the object recipe in an object storage. The object storage may be a storage as illustrated in FIG. 14C. The object storage may be a persistent storage.

Figure 17:
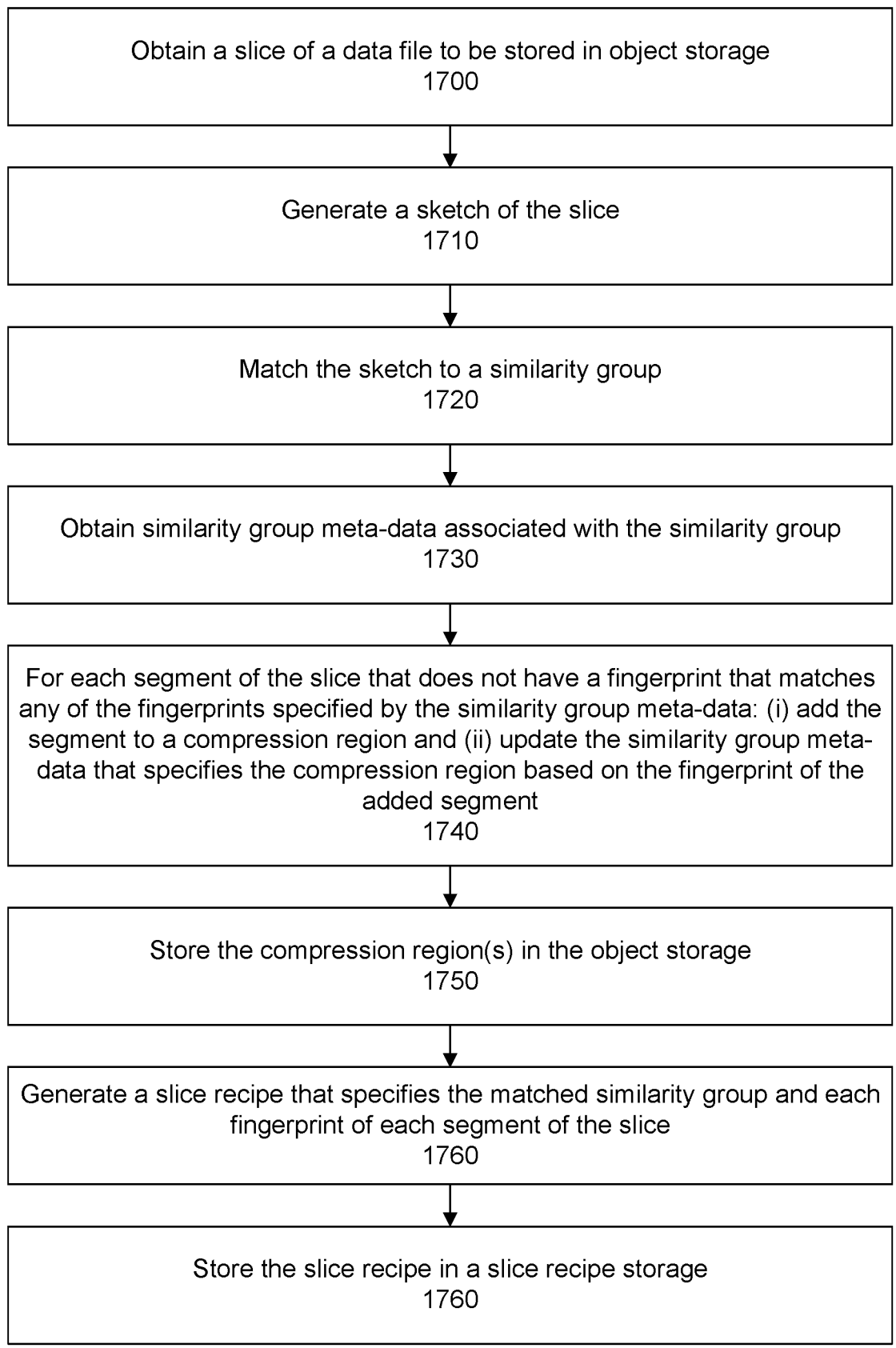
FIG. 17 shows a flowchart of a second method of storing data in an object storage in accordance with one or more embodiments.

FIG. 17 shows a flowchart according to one or more embodiments. The method depicted in FIG. 17 may be used to store data in an object storage in accordance with one or more embodiments. The method shown in FIG. 17 may be performed by, for example, a backend micro-service of the deduplication service 1310 (FIG. 13).

In step 1700, a backend micro-service may obtain a slice of a data file. The slice may be obtained from a message queue that load-balances requests to store slices in the object storage and requests to read slices from the object storage across multiple backend micro-services of the deduplication service. In one or more embodiments, the slice may be obtained by notifying the messaging queue that the backend micro-service is available to process additional requests. In one or more embodiments, the backend micro-service may read the slice from the message queue and notify the message manager and/or the message queue that the slice has been read and/or is being processed by the backend micro-service.

In step 1710, the backend micro-service may generate a sketch of the slice. The sketch of the slice may be a sketch as describe with respect to FIG. 14B. The sketch may be obtained by generating a weak hash of the slice.

In one or more embodiments, the weak hash may include multiple maximal and/or minimal hash values obtained by performing rolling hash functions over the data of the slice. For example, four rolling hash functions may be performed over the data of the slice and maximal hash value seen for each of the four rolling hash functions may be aggregated.

A hash of the aggregated hash values may be generated to obtain a single hash. The single hash may be used as the sketch of the slice.

In one or more embodiments, the sketch is a bit sequence that matches sketches of other slices, already stored in the object storage, that have similar or identical data.

In step 1720, the backend micro-service may match the sketch obtained in step 1710 to a sketch specified by one of the similarity group meta-data stored in the object storage 1360 (FIG. 14A). The sketch may be matched by sequentially comparing the bit sequence of the sketch to the bit sequence of each sketch of each similarity group meta-data stored in the object storage until an identical bit sequence is found.

In one or more embodiments, a new similarity group meta-data entry is generated and stored in the object storage if the sketch of the slice does not match a sketch of any similarity group meta-data that is already stored in object storage.

In step 1730, the backend micro-service obtains the fingerprints of the similarity group meta-data to which the sketch was matched in step 1720. The backend micro-service may obtain the fingerprints by extracting the fingerprints from the object storage and loading them into a memory of a cloud platform, or other computing device, on which the backend micro-service is executing.

In step 1740, the backend micro-service compares each fingerprint of each segment of the slice to each fingerprint obtained in step 1730. For each fingerprint that does not match any of the obtained fingerprints, the segment that corresponds to the fingerprint may be added to a compression region and the matched similarity group meta-data of step 1720 may be updated. That is, in a specific embodiment, a segment is stored in one compression region. In another specific embodiment, a segment may be added to more than one compression region. In regards to the updating, a structure for the compression region is added to the similarity group, where the structure has the fingerprints and sizes for the corresponding segments in the compression region. The similarity group meta-data may be updated by adding, modifying, or deleting other data from the similarity group meta-data without departing from the invention.

The fingerprint of each segment of the slice may be a bit sequence as described with respect to FIG. 14A. In one or more embodiments of the invention, segment boundaries of each fingerprint of each segment of the slice may be generated using Rabin's fingerprinting algorithm. In one or more embodiments of the invention, each fingerprint of each segment of the slice may be generated using a cryptographic hash function. The cryptographic hash function may be, for example, a message digest (MD) algorithm or a secure hash algorithm (SHA). The message MD algorithm may be MD5. The SHA may be SHA-0, SHA-1, SHA-2, or SHA3. Other fingerprinting algorithms may be used without departing from the invention. In step 1750, the backend micro-service stores the one or more compression regions in the object storage.

In step 1760, the backend micro-service generates a slice recipe that specifies an identifier of the matched similarity group of step 1720 and an identifier of each fingerprint of each segment of the slice of step 1740. The slice recipe may be a slice recipe as illustrated in FIG. 14D.

In step 1770, the backend micro-service may store the slice recipe in a slice recipe storage. The slice recipe storage may be a storage as illustrated in FIG. 14C and may be stored on a persistent storage.

In one or more embodiments, the backend micro-service may send a storage completion indicator to the frontend micro-service that sent the slice after or concurrently with storing the slice in the object storage.

Figure 18:
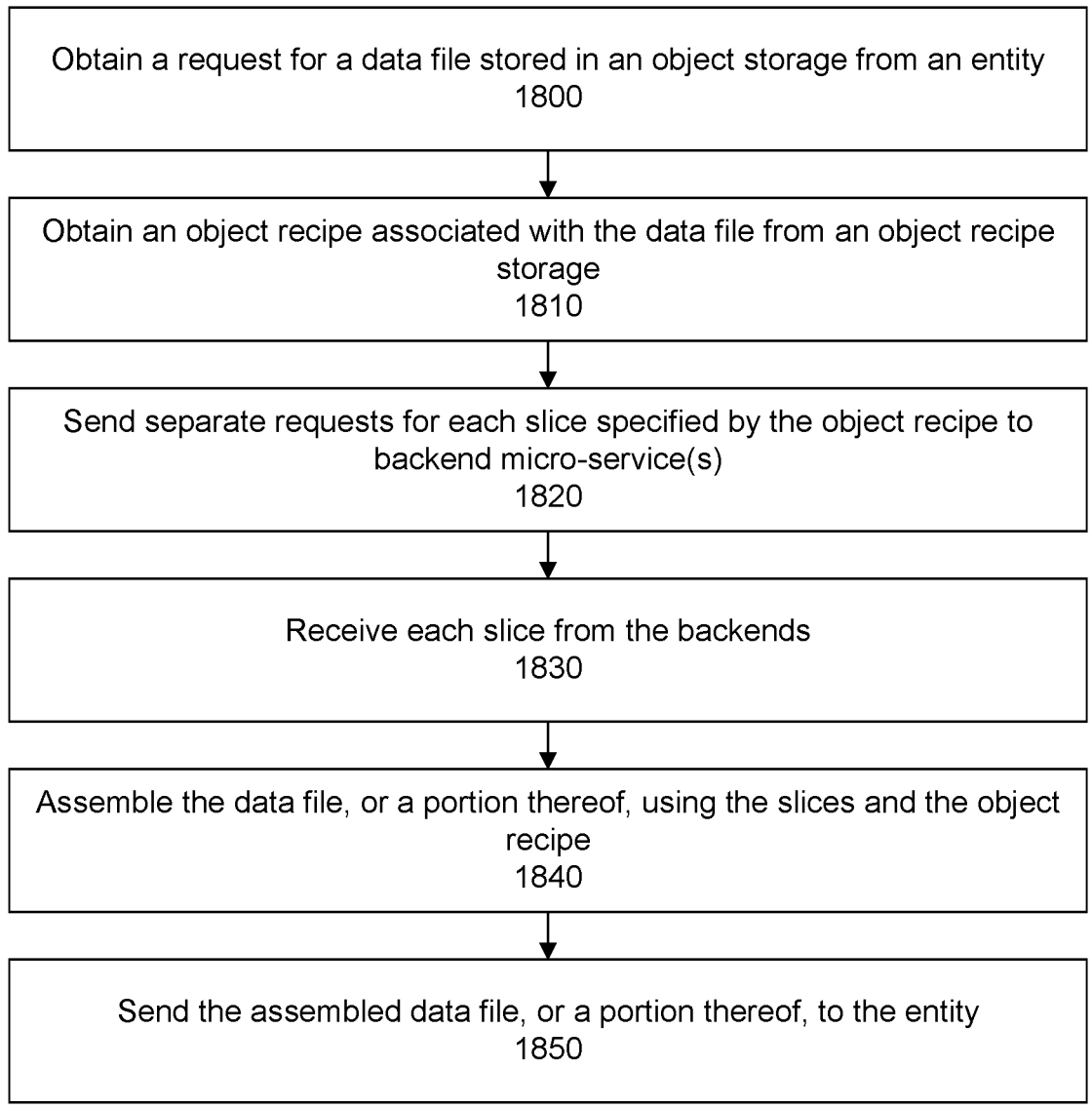
FIG. 18 shows a flowchart of a method of reading data stored in an object storage in accordance with one or more embodiments.

FIG. 18 shows a flowchart according to one or more embodiments. The method depicted in FIG. 18 may be used to obtain data from an object storage in accordance with one or more embodiments. The method shown in FIG. 18 may be performed by, for example, a frontend micro-service of the deduplication service 1310 (FIG. 13).

In step 1800, a frontend micro-service may obtain a request for a data file stored in an object storage from an entity. The request may be obtained from a load balancer that distributes requests from clients to the frontend micro-service.

In step 1810, the frontend micro-service may obtain an object recipe specified by the request. The object recipe may be an object recipe as illustrated in FIG. 14C.

In step 1820, the frontend micro-service may send requests for each slice specified by the object recipe to one or more backend micro-services. The slice requests may be sent to the backend micro-services via a message manager that queues the requests and, when a backend micro-service is available, distributes the requests to backend micro-services.

In step 1830, the frontend micro-service may receive each slice specified by the object recipe from the one or more backend micro-services. The slices may be received via the message manager via a queue.

In step 1840, the frontend micro-service assembles a data file, or a portion thereof, using the slices obtained in step 1830 and the object recipe obtained in step 1800. The data file may be assembled by appending each of the slices in an order specified by the object recipe.

In step 1850, the frontend micro-service sends the assembled data file to the entity that requested the data file.

Figure 19:
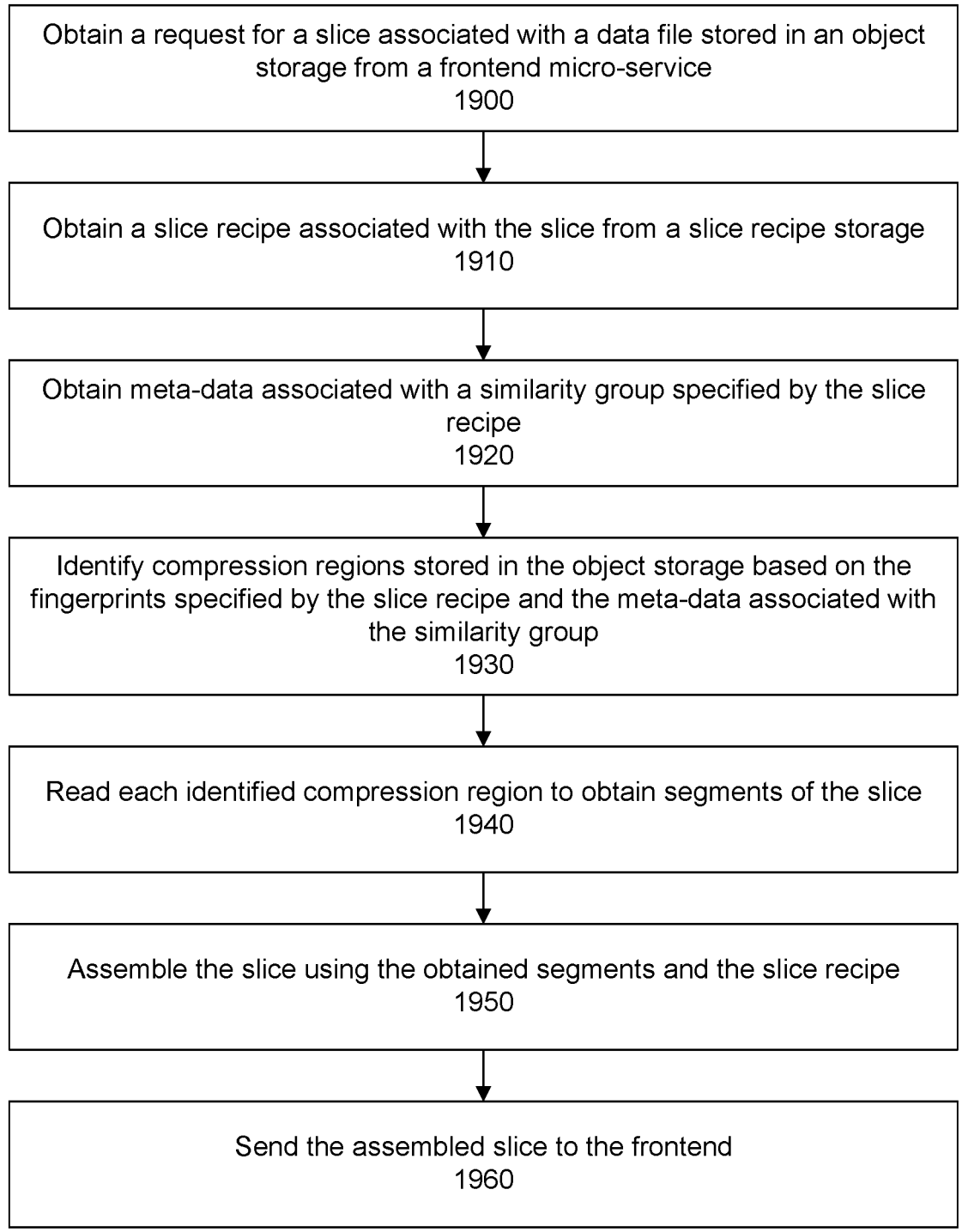
FIG. 19 shows a flowchart of a second method of reading data stored in an object storage in accordance with one or more embodiments.

FIG. 19 shows a flowchart according to one or more embodiments. The method depicted in FIG. 19 may be used to obtain data stored in an object storage in accordance with one or more embodiments. The method shown in FIG. 19 may be performed by, for example, a backend micro-service of the deduplication service 1310 (FIG. 13).

In step 1900, a backend micro-service may obtain a request for a slice of a data file. The request for the slice may be obtained from a message queue that load-balances requests to store slices in the object storage and requests to read slices from the object storage across multiple backend micro-services of the deduplication service. In one or more embodiments, the request for the slice may be obtained by notifying the messaging queue that the backend micro-service is available to process additional requests. The message queue may provide the backend micro-service with the request in response to the notification. In one or more embodiments, the backend micro-service may read the request for the slice from the message queue and notify the message manager and/or the message queue that the request for the slice has been read and/or is being processed by the backend micro-service.

In step 1910, the backend micro-service may obtain a slice recipe associated with the slice from a slice recipe storage. The slice recipe may be a slice recipe as illustrated in FIG. 14D. The slice recipe may be obtained by matching a name of the slice or data included in the request to a slice recipe name of a slice recipe stored in the slice recipe storage. The slice recipe may be obtained by reading the matched slice recipe from the slice recipe storage.

In step 1920, the backend micro-service may obtain similarity group meta-data specified by the slice recipe using a similarity group meta-data identified specified by the slice recipe of step 1910.

In step 1930, the backend micro-service may identify compression regions stored in the object storage and specified by the obtained similarity group meta-data.

In step 1940, the backend micro-service may read each of the identified compression regions of step 1930 from the object storage to obtain segments of the slice.

In step 1950, the backend micro-service may assemble the slice using the obtained segments of the slice and the slice recipe.

In step 1960, the backend micro-service may send the assembled slice to the frontend micro-service that requested the slice.

Figure 20:
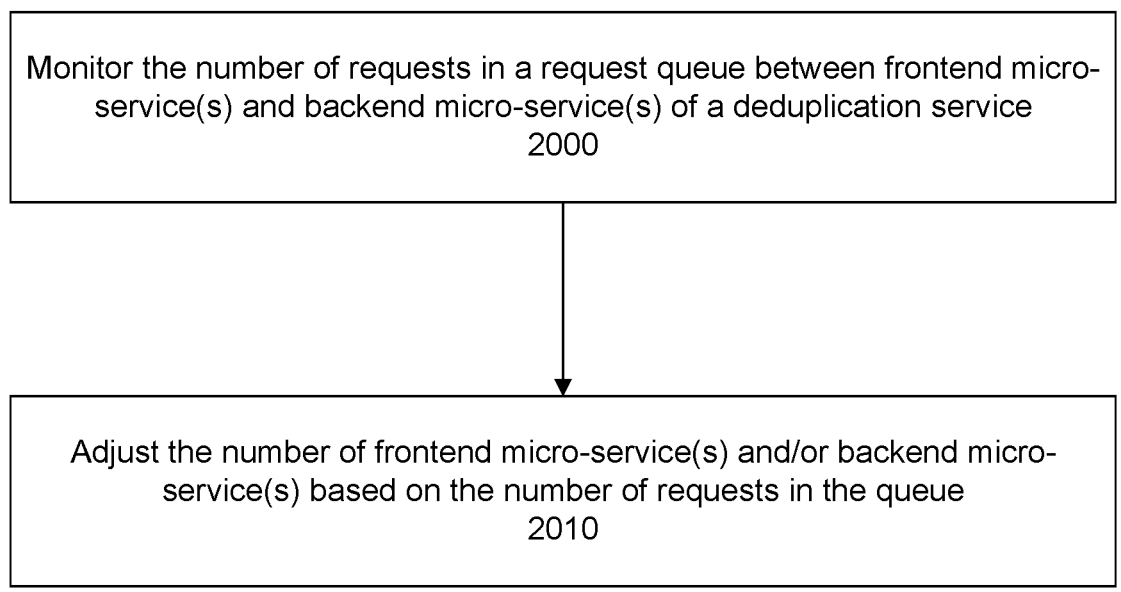
FIG. 20 shows a flowchart of a method of adjusting the quantity of computing resources assigned to frontend micro-services or backend micro-services in accordance with one or more embodiments.

FIG. 20 shows a flowchart in accordance with one or more embodiments. The method depicted in FIG. 20 may be used to modify the quantity of resources dedicated to managing data of an object storage in accordance with one or more embodiments. The method shown in FIG. 20 may be performed by, for example, a deduplication service 1310 (FIG. 13).

In step 2000, the number of requests in a request queue between a number of front end micro-services and a number of backend micro-services may be monitored.

In step 2010, the number of frontend micro-services and/or backend micro-services may be adjusted. In other words, new instances of micro-services may be added or executing instances of micro-services may be terminated.

In one or more embodiments, new instances of backend micro-services may be added if the number of requests in the request queue exceeds a predetermined number. In other words, new instances of backend micro-services may be added if the rate of request processing of the currently executing backend micro-services is less than a rate of requests being added to the queue.

In one or more embodiments, currently executing instances of backend micro-services may be terminated if the number of requests in the request queue is less than a predetermined number. In other words, currently executing instances of backend micro-services may be terminated if the rate of request processing capacity of the currently executing backend micro-services is greater than a rate of requests being added to the queue.

In one or more embodiments, new instances of frontend micro-services may be added if the number of requests in the load balancer queue is more than a predetermined number. In other words, new instances of frontend micro-services may be added if the rate of client requests is greater than a rate of requests being handled by front-end micro-services.

In one or more embodiments, currently executing instances of frontend micro-services may be terminated if the number of requests in the load-balancer queue is less than a predetermined number. In other words, currently executing instances of frontend micro-services may be terminated if the rate of client requests is less than a rate of requests that could be handled by the current set of front-ends micro-services.

In one or more embodiments, the quantity of frontend and/or backend micro-services may be adjusted based on an aggregate resource utilization of a computing resources such as CPU, memory, and/or network bandwidth. The quantity of frontend and/or backend micro-services may be adjusted when the aggregate usage of a resource exceeds a threshold. The threshold may be, for example, an upper threshold or a lower threshold, respectively, which triggers adding or terminating instances of frontend and/or backend micro-services.

One or more embodiments may enable one or more of the following: i) separation of preparation of data files for deduplication and deduplication of the prepared files into separate micro-services, ii) dynamic adjustments of computing resources used for preparation of files for deduplication or deduplication of prepared files by adding new instances of micro-services and/or terminating existing instances of micro-services, iii) scaling of deduplication of data across an arbitrary number of computing resources, and iv) minimizing the computing resource cost of deduplicating data for storage in an object storage by only loading a subset of all of the fingerprints of every segment stored in an object storage by performing similarity group mapping.

FIG. 21 shows a system block diagram of a computer system 2105 used to execute the software of the present system described herein. The computer system includes a monitor 2107, keyboard 2115, and mass storage devices 2120. Computer system 2105 further includes subsystems such as central processor 2125, system memory 2130, input/output (I/O) controller 2135, display adapter 2140, serial or universal serial bus (USB) port 2145, network interface 2150, and speaker 2155. The system may also be used with computer systems with additional or fewer subsystems. For example, a computer system could include more than one processor 2125 (i.e., a multiprocessor system) or a system may include a cache memory.

Arrows such as 2160 represent the system bus architecture of computer system 2105. However, these arrows are illustrative of any interconnection scheme serving to link the subsystems. For example, speaker 2155 could be connected to the other subsystems through a port or have an internal direct connection to central processor 2125. The processor may include multiple processors or a multicore processor, which may permit parallel processing of information. Computer system 2105 shown in FIG. 21 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, a method of replicating data includes: providing, at a source site, a controller, a plurality of source worker nodes, and a message queue, coupled between the controller and the plurality of source worker nodes; providing, at a destination site, a plurality of destination worker nodes; defining a replication context specifying a replication frequency, and information identifying objects at the source site to replicate; identifying, by the controller, differences between a first snapshot created at the source site at a first time and a second snapshot created at the source site at a second time, after the first time; based on the differences, generating a set of tasks comprising one or more of copying an object from the source site to the destination site, or deleting an object from the destination site; placing, by the controller, the tasks onto the message queue; retrieving, by a first source worker node, a first task from the message queue; coordinating, by the first source worker node, with a first destination worker node to perform the first task; retrieving, by a second source worker node, different from the first source worker node, a second task from the message queue; and coordinating, by the second source worker node, with a second destination worker node to perform the second task.

The method may include storing a schedule indicating when replication from the source to destination site is to occur; creating the first snapshot according to the schedule; and creating the second snapshot according to the schedule.

In an embodiment, the first snapshot comprises a first listing of objects stored in an object storage at the source site as of the first time, the second snapshot comprises a second listing of objects stored in the source object storage as of the second time, and the method comprises: receiving the first and second listings in an alphabetical sort; comparing the alphabetically sorted first and second listings; determining from the comparison that the first listing includes an object not included in the second listing; and upon the determination, generating the first task, the first task comprising an instruction to delete the object from the destination site.

In an embodiment, the first snapshot comprises a first listing of objects stored in an object storage at the source site as of the first time, the second snapshot comprises a second listing of objects stored in the source object storage as of the second time, and the method comprises: receiving the first and second listings in an alphabetical sort; comparing the alphabetically sorted first and second listings; determining from the comparison that the second listing includes an object not included in the first listing; and upon the determination, generating the first task, the first task comprising an instruction to copy the object to the destination site.

In an embodiment, the first snapshot comprises a first listing of objects stored in an object storage at the source site as of the first time, the second snapshot comprises a second listing of objects stored in the object storage as of the second time, and the method comprises: receiving the first and second listings in an alphabetical sort; comparing the alphabetically sorted first and second listings; determining from the comparison that an object listed in both the first and second listings has a timestamp that changed between the first and second snapshots, the object listed in the first listing having an earlier timestamp, and the object listed in the second listing having a later timestamp; and upon the determination, generating the first task, the first task comprising an instruction to copy the object with the later timestamp to the destination site, and the second task comprising an instruction to delete the object with the earlier timestamp from the destination site.

The first and second tasks may be performed in parallel with each other.

In a specific embodiment, a method includes: generating a set of tasks associated with a replication job, the replication job comprising replicating from a source site to a destination site; allocating an initial number of worker nodes to process the set of tasks, each task involving a first type of worker node at the source site, a second type of worker node at the destination site, and comprising one or more of copying an object from the source site to the destination site, or deleting an object from the destination site; monitoring the replication job; and based on the monitoring, adjusting a number of worker nodes to process the set of tasks from the initial number to a new number, different from the initial number.

In an embodiment, adjusting a number of worker nodes comprises allocating additional worker nodes, the new number of worker nodes thereby being greater than the initial number of worker nodes. In an embodiment, the adjusting a number of worker nodes comprises deallocating worker nodes, the new number of worker nodes thereby being less than the initial number of worker nodes.

The method may include placing the set of tasks onto a message queue for worker nodes of the first type to retrieve and process in conjunction with worker nodes of the second type; tracking a number of tasks remaining on the message queue; and when the number of tasks remaining on the message queue exceeds a threshold, allocating additional worker nodes.

The method may include receiving a constraint indicating a duration of time permitted to complete the replication job; calculating a number and a size of objects at the source site that are to be replicated to the destination site; and based on the number and size of objects that are to be replicated, allocating a sufficient number of worker nodes at the source and destination sites to complete the replication job within the permitted duration of time.

The method may include receiving a constraint indicating a maximum cost for the replication job; and based on the maximum cost, allocating the initial number of worker nodes such that a total cost for the worker nodes does not exceed the maximum cost.

The method may include assessing a priority level of a data set to be replicated; if the priority level of the data set is of low priority, allocating a first initial number of worker nodes; and if the priority level of the data set is of a high priority, allocating a second initial number of worker nodes, greater than the first initial number of worker nodes.

In an embodiment, the new number of worker nodes is zero, each of the worker nodes thereby having been deallocated. In an embodiment, a method may include: obtaining a metric indicating CPU utilization associated with the worker nodes; and scaling the number of worker nodes based on the CPU utilization being above or below a threshold.

In a specific embodiment, a method includes generating, by a controller at a source site, a plurality of tasks associated with a replication job, each task involving a source worker node from among a plurality of source worker nodes at the source site, a destination worker node from among a plurality of destination worker nodes at a destination site, and comprising one or more of copying an object from the source site to the destination site, or deleting an object from the destination site; receiving, at a message queue coupled between the controller and the plurality of source worker nodes, status update messages concerning the plurality of tasks from the source worker nodes; logging the status update messages into a persistent key-value store; upon a failure to complete the replication job, accessing the key-value store to identify tasks of the plurality of tasks that were and were not completed before the failure; and resending the tasks that were not completed to the source worker nodes and not resending the tasks that were completed.

The method may include calculating differences between a first snapshot created at the source site at a first time and a second snapshot created at the source site at a second time, after the first time, to generate the plurality of tasks; after the failure to complete the replication job, recalculating the differences between the first and second snapshots; determining, from an examination of the key-value store, that a first difference between the first and second snapshots and corresponding to a first task of the plurality of tasks was completed; determining, from the examination of the key-value store, that a second difference between the first and second snapshots and corresponding to a second task of the plurality of tasks was not completed; and resending the second task to a second message queue and not resending the first task.

The method may include periodically checking the message queue for the status update messages; determining that an amount of time elapsed since a particular source worker node last reported with a status update message associated with a particular task has exceeded a threshold time period; and upon the determination, resending the particular task to the message queue.

The method may include periodically checking the message queue for the status update messages; determining, from the periodic check, that a particular source worker node has reported an error; and sending an alert to an administrator concerning the error.

In an embodiment, a status update message specifies an object to be replicated from the source site to the destination site, and identifies portions of the object already replicated from the source site to the destination site. In an embodiment, the resending the tasks that were not completed comprises: resending the tasks to a message queue for retrieval by the source worker nodes.

In a specific embodiment, a method includes: fetching, by a first source worker node at a source site, a first task from a message queue, the first task specifying replicating a first object at the source site to a destination site; issuing, from the first source worker node to the destination site, a first request for a first connection, the first request being received by a load balancer at the destination site and assigned to a first destination worker node; establishing the first connection between the first source and destination worker nodes; determining that the destination site does not include an object having a same name, timestamp, size, and checksum as the first object; upon the determining, performing between the first source worker node and the first destination worker node a deduplication of segments into which the first object has been divided; and transmitting from the first source worker node to the first destination worker node non-duplicate (e.g., unique) segments of the first object for storage at the destination site. In other words, the segments that are transmitted are those that are determined to not already exist at the destination.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
providing, at a source site, a controller, a plurality of source worker nodes, and a message queue, coupled between the controller and the plurality of source worker nodes, wherein the source site comprises an object storage system storing objects, the objects having been split into a plurality of segments;
providing, at a destination site, a plurality of destination worker nodes;
as objects are written to and deleted from the object storage system at the source site, maintaining a log listing, by user-generated names given to the objects, the objects that have been written to the object storage system at the source site and the objects that have been deleted from the object storage system at the source site;
upon starting a replication job, generating a set of tasks comprising tasks to replicate objects written to the object storage system at the source site to the destination site according to the log, and tasks to delete objects from the destination site that have been deleted from the object storage system at the source site according to the log;
pushing, by the controller, the tasks onto the message queue;
retrieving, by a first source worker node, a first task from the message queue for processing in conjunction with a first destination worker node;
when the first task is to delete an object from the destination site, making a remote procedure call (RPC) to the first destination worker node requesting that the object be deleted; and
when the first task is to replicate an object from the source to destination site,
determining which segments of the object exist at the destination site and which segments of the object do not exist at the destination site, the segments of the object not existing at the destination site thereby being missing segments; and
sending the missing segments of the object to the destination site,
wherein the object storage system storing objects at the source site comprises object recipes corresponding to the objects, each object recipe referencing one or more slice recipes, each slice recipe comprising a plurality of fingerprints corresponding to the segments into which an object has been split, and each fingerprint mapping to a respective segment, and
wherein replication of the object from the source to destination site further comprises:
issuing, to the first destination worker node, a query comprising a batch of slice recipes from an object recipe corresponding to the object to be replicated;

checking, by the first destination worker node, which segments of the object identified by fingerprints in the batch of slice recipes already exist at the destination site;

based on the checking, replying to the first source worker node with a listing of fingerprints from the batches of slice recipes, wherein the listing of fingerprints correspond to segments of the object that are missing at the destination site thereby allowing the first source worker node to retrieve and send the missing segments to the destination site; and repeating the issuing a query comprising a batch of slice recipes until all slice recipes of the object recipe have been sent to the first destination worker node.

2. The method of claim 1 further comprising:

holding the tasks on the message queue for retrieval by the plurality of source worker nodes;

determining that a number of tasks on the message queue has reached a threshold limit; and pausing the generating tasks and the pushing of the tasks onto the message queue while allowing the plurality of source worker nodes to continue retrieving tasks from the message queue, thereby freeing space on the message queue.

3. The method of claim 2 further comprising:

after the pausing, continuing the generating tasks and the pushing of the tasks onto the message queue.

4. The method of claim 1 further comprising logging in a key-value store the batch of one or more slice recipes that the first source worker node has sent to the first destination worker node; and upon a failure during the replication of the object, restarting the replication from a last logged position of the batch of one or more slice recipes that the first source worker node has sent to the first destination worker node according to the key-value store.

5. The method of claim 1 further comprising:

designating different controllers to handle different portions of a replication job, the replication job comprising replicating the changes to the objects at the source site to the destination site.

6. The method of claim 1 wherein names of the objects listed in the log comprise timestamps appended to the user-generated names indicating when the objects were written to the object storage system at the source site.

7. The method of claim 1 wherein the message queue resides in volatile memory.

8. The method of claim 1 wherein a cost of the replication job is subject to spot pricing and the method further comprises:

monitoring a price associated with renting a source working node, a destination worker node, or both;

when the price is above a user-configured threshold price, pausing the replication job; and when the price falls below the user-configured threshold price, resuming the replication job.

9. A system for replicating data, the system comprising: a processor, and memory storing one or more sequences of instructions which, when executed by the processor, cause the processor to carry out the steps of:

providing, at a source site, a controller, a plurality of source worker nodes, and a message queue, coupled between the controller and the plurality of source worker nodes, wherein the source site comprises an object storage system storing objects, the objects having been split into a plurality of segments;

providing, at a destination site, a plurality of destination worker nodes;

as objects are written to and deleted from the object storage system at the source site, maintaining a log of the objects that have been written and the objects that have been deleted;

upon starting a replication job, generating a set of tasks comprising tasks to replicate objects written to the object storage system at the source site to the destination site according to the log, and tasks to delete objects from the destination site that have been deleted from the object storage system at the source site according to the log;

pushing, by the controller, the tasks onto the message queue;

retrieving, by a first source worker node, a first task from the message queue for processing in conjunction with a first destination worker node;

when the first task is to delete an object from the destination site, making a remote procedure call (RPC) to the first destination worker node requesting that the object be deleted; and when the first task is to replicate an object from the source to destination site, determining which segments of the object exist at the destination site and which segments of the object do not exist at the destination site, the segments of the object not existing at the destination site thereby being missing segments; and sending the missing segments of the object to the destination site, wherein the object storage system storing objects at the source site comprises object recipes corresponding to the objects, each object recipe referencing one or more slice recipes, each slice recipe comprising a plurality of fingerprints corresponding to the segments into which an object has been split, and each fingerprint mapping to a respective segment, and wherein replication of the object from the source to destination site further comprises:

sending, by the first source worker node to the first destination worker node, one or more slice recipes from an object recipe corresponding to the object to be replicated, wherein the first destination worker node checks the fingerprints in the slice recipes against fingerprints of segments already existing at the destination site to determine which segments of the object are missing at the destination site;

logging in a key-value store the one or more slice recipes that the first source worker node has sent to the first destination worker node; and upon a failure during the replication of the object, restarting the replication from a last logged position of the one or more slice recipes that the first source worker node has sent to the first destination worker node according to the key-value store.

10. The system of claim 9 wherein the processor further carries out the steps of:

holding the tasks on the message queue for retrieval by the plurality of source worker nodes;

determining that a number of tasks on the message queue has reached a threshold limit; and pausing the generating tasks and the pushing of the tasks onto the message queue while allowing the plurality of source worker nodes to continue retrieving tasks from the message queue, thereby freeing space on the message queue.

11. The system of claim 10 wherein the processor further carries out the steps of:
after the pausing, continuing the generating tasks and the pushing of the tasks onto the message queue.

12. The system of claim 9 wherein the processor further carries out the steps of:
designating different controllers to handle different portions of a replication job, the replication job comprising replicating the changes to the objects at the source site to the destination site.

13. The system of claim 9 wherein names of the objects listed in the log comprise user-generated names given to the objects and timestamps appended to the user-generated names indicating when the objects were written to the object storage system at the source site.

14. A computer program product comprising a non-transitory computer-readable medium having a computer-readable program code embodied therein, the computer-readable program code adapted to be executed by one or more processors to implement a method comprising:
providing, at a source site, a controller, a plurality of source worker nodes, and a message queue, coupled between the controller and the plurality of source worker nodes, wherein the source site comprises an object storage system storing objects, the objects having been split into a plurality of segments;
providing, at a destination site, a plurality of destination worker nodes;
as objects are written to and deleted from the object storage system at the source site, maintaining a log of the objects that have been written and the objects that have been deleted;
upon starting a replication job, generating a set of tasks comprising tasks to replicate objects written to the object storage system at the source site to the destination site according to the log, and tasks to delete objects from the destination site that have been deleted from the object storage system at the source site according to the log;
pushing, by the controller, the tasks onto the message queue;
retrieving, by a first source worker node, a first message corresponding to a first task from the message queue for processing in conjunction with a first destination worker node;
when the first task is to delete an object from the destination site, making a remote procedure call (RPC) to the first destination worker node requesting that the object be deleted;
when the first task is to replicate an object from the source to destination site,
determining which segments of the object exist at the destination site and which segments of the object do not exist at the destination site, the segments of the object not existing at the destination site thereby being missing segments; and
sending the missing segments of the object to the destination site;
tracking a depth of the message queue; and
based on the depth of the message queue, adjusting a number of source worker nodes and a number of destination worker nodes.

15. The computer program product of claim 14 wherein the method further comprises:
holding the tasks on the message queue for retrieval by the plurality of source worker nodes;
determining that a number of tasks on the message queue has reached a threshold limit; and
pausing the generating tasks and the pushing of the tasks onto the message queue while allowing the plurality of source worker nodes to continue retrieving tasks from the message queue, thereby freeing space on the message queue.

16. The computer program product of claim 15 wherein the method further comprises:
after the pausing, continuing the generating tasks and the pushing of the tasks onto the message queue.

17. The computer program product of claim 14 wherein the object storage system storing objects at the source site comprises object recipes corresponding to the objects, each object recipe referencing one or more slice recipes, each slice recipe comprising a plurality of fingerprints corresponding to the segments into which an object has been split, and each fingerprint mapping to a respective segment, and
wherein replication of the object from the source to destination site further comprises:
sending, by the first source worker node to the first destination worker node, one or more slice recipes from an object recipe corresponding to the object to be replicated, wherein the first destination worker node checks the fingerprints in the slice recipes against fingerprints of segments already existing at the destination site to determine which segments of the object are missing at the destination site;
logging in a key-value store the one or more slice recipes that the first source worker node has sent to the first destination worker node; and
upon a failure during the replication of the object, restarting the replication from a last logged position of the one or more slice recipes that the first source worker node has sent to the first destination worker node according to the key-value store.

18. The computer program product of claim 14 wherein the method further comprises:
designating different controllers to handle different portions of a replication job, the replication job comprising replicating the changes to the objects at the source site to the destination site.

19. The computer program product of claim 14 wherein names of the objects listed in the log comprise user-generated names given to the objects and timestamps appended to the user-generated names indicating when the objects were written to the object storage system at the source site.

* * * * *